(12) United States Patent
Sako et al.

(10) Patent No.: US 6,947,362 B2
(45) Date of Patent: Sep. 20, 2005

(54) INFORMATION RECORDING MEDIUM, STORAGE MEDIUM, INFORMATION REPRODUCTION APPARATUS AND METHOD, AND INFORMATION RECORDING AND REPRODUCTION APPARATUS AND METHOD AS WELL AS PROVIDING MEDIUM

(75) Inventors: Yoichiro Sako, Tokyo (JP); Takashi Sato, Tokyo (JP); Shunsuke Furukawa, Tokyo (JP); Kazunobu Saito, Kanagawa (JP); Mitsuru Toriyama, Chiba (JP); Takao Ihashi, Chiba (JP)

(73) Assignee: Sony Corporation, Tokyo (JP)

( * ) Notice: Subject to any disclaimer, the term of this patent is extended or adjusted under 35 U.S.C. 154(b) by 20 days.

(21) Appl. No.: 10/692,763

(22) Filed: Oct. 23, 2003

(65) Prior Publication Data

US 2004/0081044 A1 Apr. 29, 2004

Related U.S. Application Data

(62) Division of application No. 09/339,554, filed on Jun. 24, 1999, now abandoned.

(30) Foreign Application Priority Data

Jun. 26, 1998 (JP) .......................................... 10-180020

(51) Int. Cl.$^7$ .............................. G11B 5/09; H04N 5/91
(52) U.S. Cl. ................................ 369/53.21; 369/47.21; 386/95
(58) Field of Search ............................. 369/53.2, 53.21, 369/53.22, 53.31, 47.21, 47.22, 47.23, 47.24, 30.01, 30.03, 30.04, 30.05; 386/95, 125

(56) References Cited

U.S. PATENT DOCUMENTS 6,393,201 B1 * 5/2002 Sakuramoto et al. ......... 386/95

* cited by examiner

Primary Examiner—Thang V. Tran
(74) Attorney, Agent, or Firm—Frommer Lawrence & Haug LLP; William S. Frommer; Darren M. Simon

(57) ABSTRACT

The invention provides an information recording medium, a storage medium, an information reproduction apparatus and method, and an information recording and reproduction apparatus and method as well as a providing medium by which information recorded on an information recording medium can be utilized only by a predetermined apparatus which corresponds to the information recording medium. A ROM has data for identification of a DVD player/recorder stored therein. A recording and reproduction section records data stored in the ROM onto a DVD and reproduces data for identification of the DVD player/recorder recorded on the DVD. A CPU controls the recording and reproduction section in accordance with the data stored in the ROM and the data reproduced by the recording and reproduction section.

6 Claims, 20 Drawing Sheets

F I G. 1
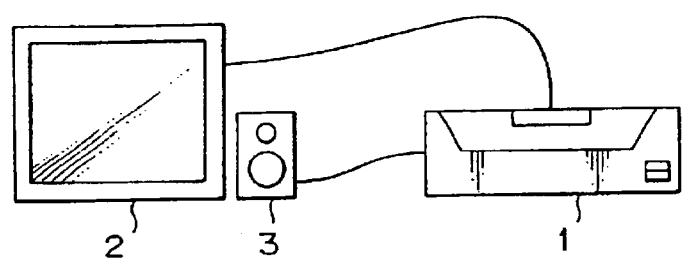
F I G. 3
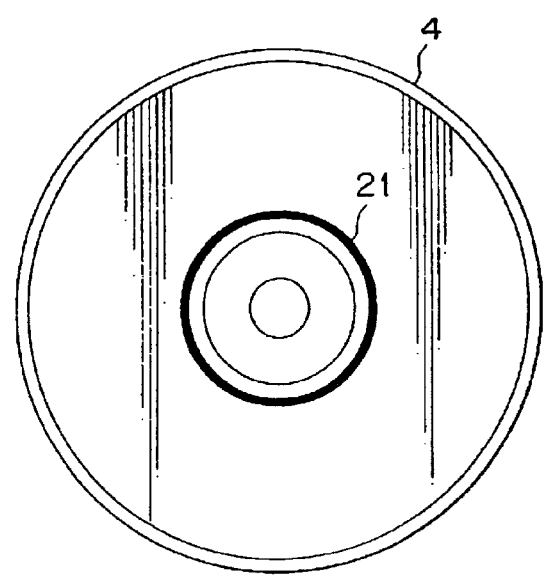

F I G. 11
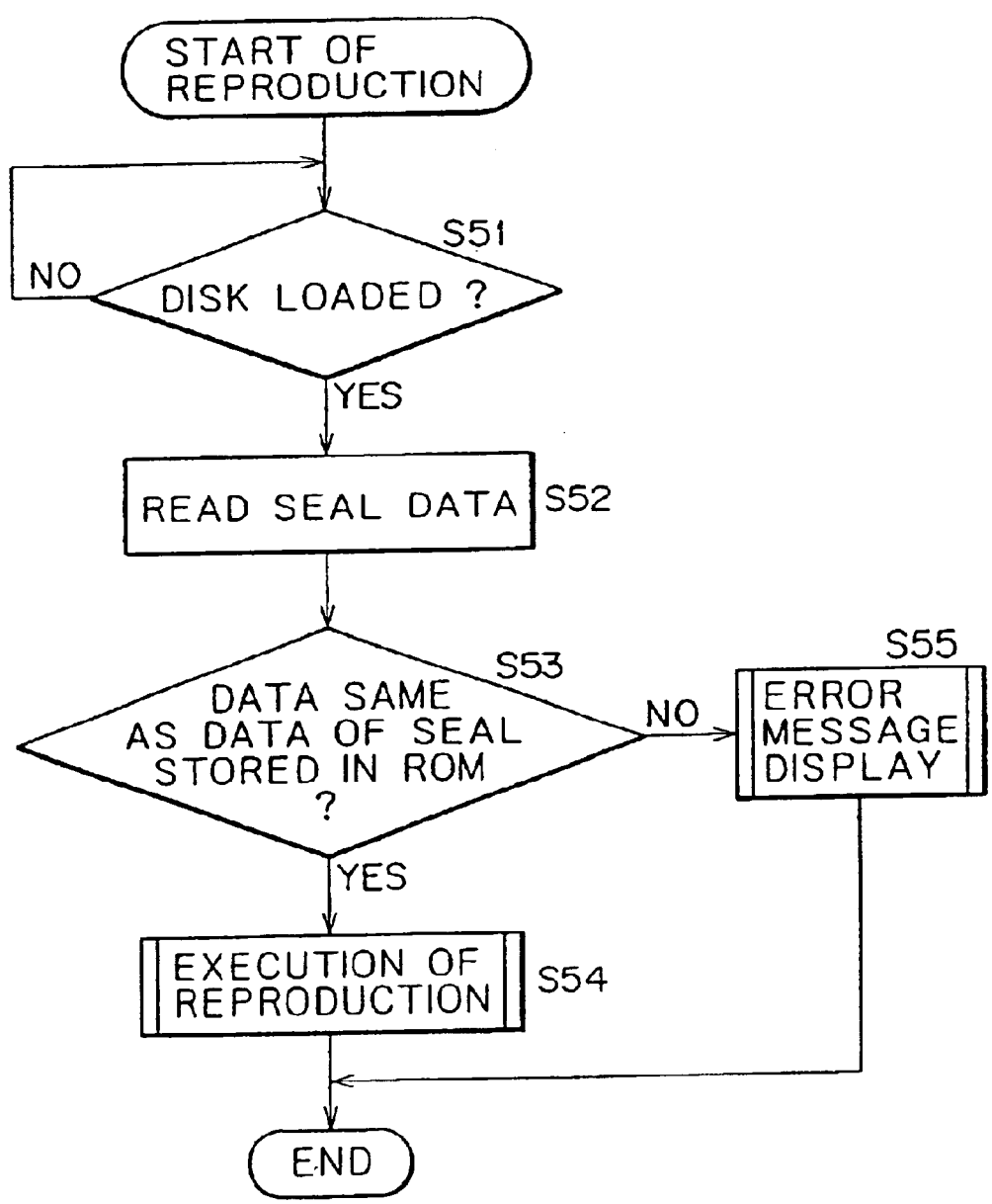

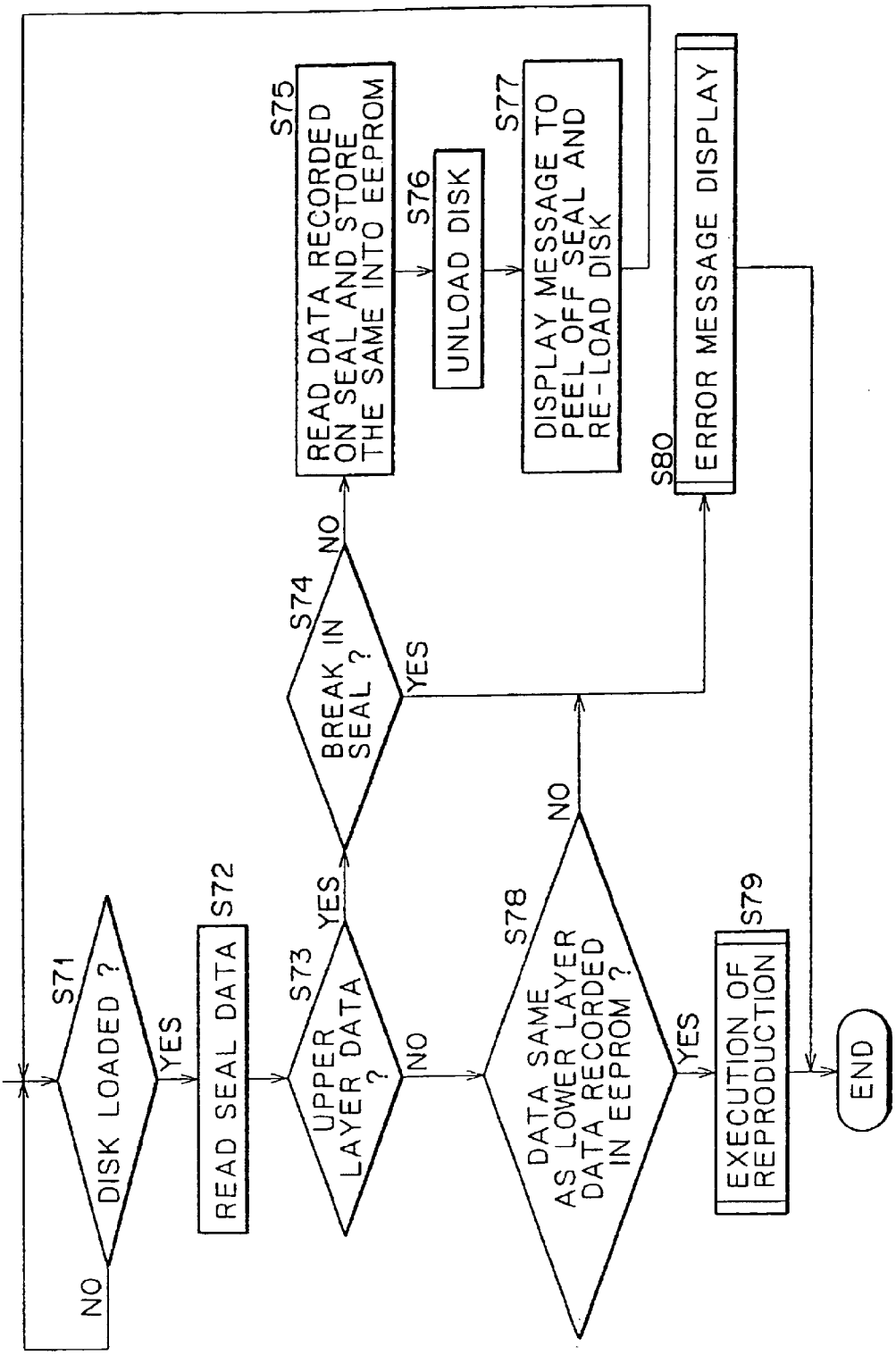

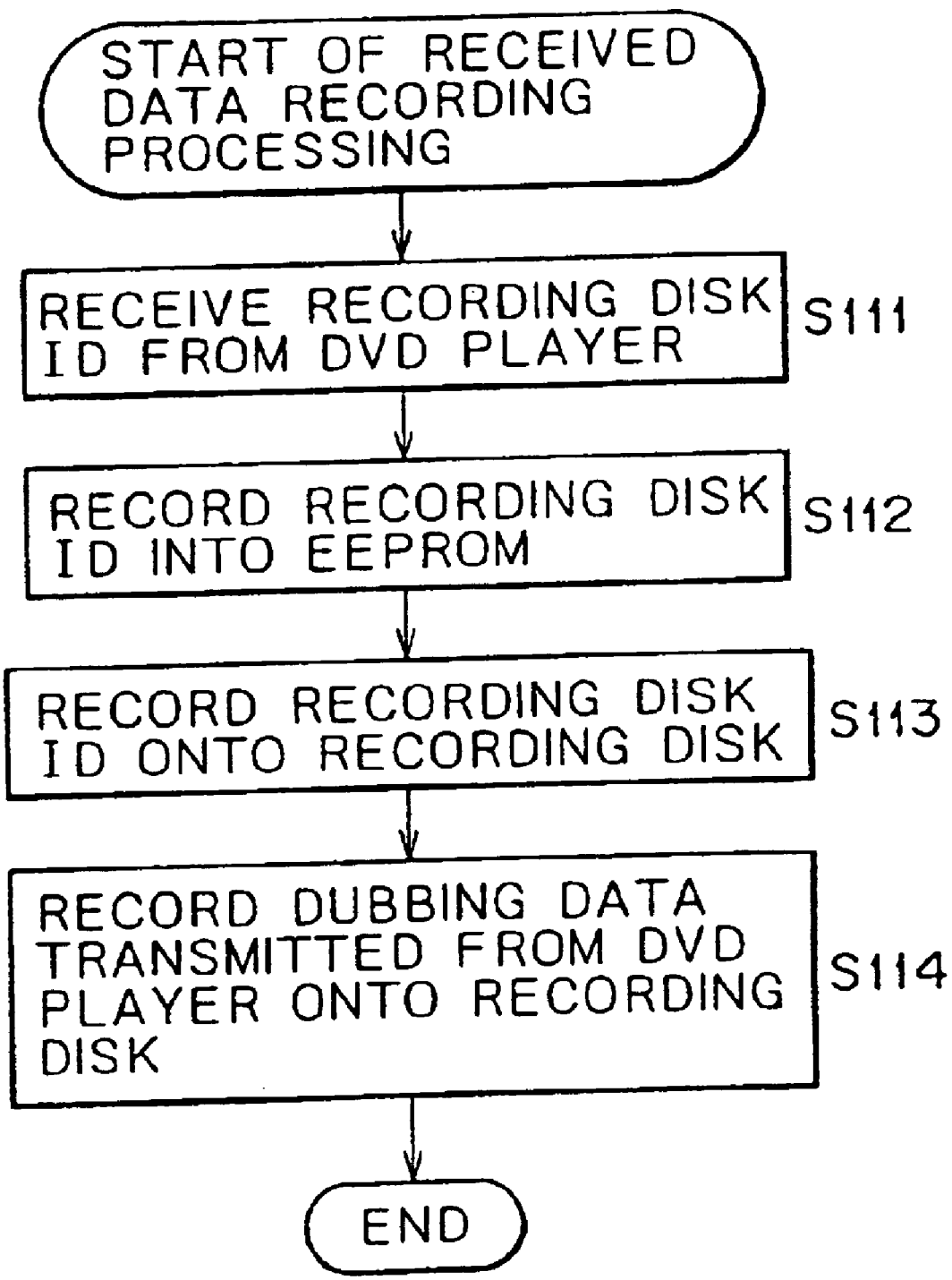

INFORMATION RECORDING MEDIUM, STORAGE MEDIUM, INFORMATION REPRODUCTION APPARATUS AND METHOD, AND INFORMATION RECORDING AND REPRODUCTION APPARATUS AND METHOD AS WELL AS PROVIDING MEDIUM

This application is a divisional of U.S. application Ser. No. 09/339,554, filed Jun. 24, 1999 now abandoned.

BACKGROUND OF THE INVENTION

This invention relates to an information recording medium, a storage medium, an information reproduction apparatus and method, and an information recording and reproduction apparatus and method as well as a providing medium, and more particularly to an information recording medium, a storage medium, an information reproduction apparatus and method, and an information recording and reproduction apparatus and method as well as a providing medium by which information recorded on an information recording medium can be utilized only by a predetermined apparatus which corresponds to the information recording medium.

A digital video tape and a DVD are utilized to record coded video and audio signals thereon. Even if a digital video tape recorder or a DVD recorder is used to copy contents recorded on a digital video tape or a DVD onto another digital video tape or DVD-R (DVD-Recordable), the copied image or sound exhibits little deterioration when compared with the original image or sound.

Also when a program recorded on a CD-ROM (Compact Disc Read Only Memory) is copied onto a CD-R (Compact Disc Recordable) or a CD-RW (Compact Disc Rewritable), contents of the copied program do not exhibit deterioration.

To transfer a digital video tape, a DVD-R, a CD-R or a CD-RW which has an image and sound or a program copied thereon without legal authorization constitutes an infringement on the right of the owner of the copyright.

Therefore, in order to prevent infringement upon the copyright by copying, a system has been proposed wherein contents enciphered in advance are recorded onto an information recording medium such as a DVD or a CD and a cryptographic key is delivered over a communication line only to a user who has paid a predetermined charge so that only the user who has paid the predetermined charge can utilize the contents recorded on the information recording medium.

However, if an information recording medium on which contents of an information recording medium such as a DVD or a CD on which enciphered contents are corded are copied by a user and a cryptographic key are transferred to another user, then the latter user can utilize the contents recorded on the information recording medium similarly as in a case wherein a predetermined charge is paid legally.

SUMMARY OF THE INVENTION

It is an object of the present invention to provide an information recording medium, a storage medium, an information reproduction apparatus and method, and an information recording and reproduction apparatus and method as well as a providing medium by which information recorded on an information recording medium can be utilized only on a predetermined information recording and reproduction apparatus corresponding to an information recording medium such as a digital video tape, a DVD, a DVD-R, a CD-R or a CD-RW so that the copyright can be protected with a higher degree of certainty.

In order to attain the object described above, according to an aspect of the present invention, there is provided an information recording medium for being loaded into an information reproduction apparatus so that information recorded on the information recording medium is reproduced by the information reproduction apparatus, having a recording region into which history information representing that the information recording medium has been played back at least once is recorded.

With the information recording medium, since history information representing that the information recording medium has been played back at least once is recorded thereon, an information reproduction apparatus can be constructed such that the information on the information recording medium can be reproduced by the information reproduction apparatus only if it is a particular information reproduction apparatus by which the data specifying the information recording medium has been read for the first time.

According to another aspect of the present invention, there is provided an information reproduction apparatus for reproducing information recorded on an information recording medium, comprising recording means for recording, onto the information recording medium, history information representing that the information recording medium has been played back at least once, reproduction means for reproducing the history information recorded on the information recording medium by the recording means, and control means for controlling reproduction of information recorded on the information recording medium in accordance with the history information reproduced by the reproduction means.

According to a further aspect of the present invention, there is provided an information reproduction method for reproducing information recorded on an information recording medium, comprising the steps of recording, onto the information recording medium, history information representing that the information recording medium has been played back at least once, reproducing the history information recorded on the information recording medium by the recording step, and controlling reproduction of information recorded on the information recording medium in accordance with the history information reproduced by the reproduction step.

According to a still further aspect of the present invention, there is provided a providing medium which provides a computer-readable program for causing an information reproduction apparatus for reproducing information recorded on an information recording medium to execute a process comprising the steps of recording, onto the information recording medium, history information representing that the information recording medium has been played back at least once, reproducing the history information recorded on the information recording medium by the recording step, and controlling reproduction of information recorded on the information recording medium in accordance with the history information reproduced by the reproduction step.

In the information reproduction apparatus, the information reproduction method and the providing medium, history information representing that the information recording medium has been played back at least once is recorded onto the information recording medium, and the history information recorded on the information recording medium is reproduced, and then reproduction of information recorded on the information recording medium is controlled in accordance with the thus reproduced history information. Consequently, the information of the information recording medium can be reproduced only by the particular information reproduction apparatus which corresponds to the information recording medium.

According to a yet further aspect of the present invention, there is provided an information recording and reproduction apparatus for recording or reproducing information onto or from an information recording medium, comprising recording means for recording, onto the information recording medium, history information representing that the information recording medium has been recorded at least once, reproduction means for reproducing the history information recorded on the information recording medium by the recording means, and control means for controlling recording or reproduction of information onto or from the information recording medium in accordance with the history information reproduced by the reproduction means.

According to a yet further aspect of the present invention, there is provided an information recording and reproduction method for recording or reproducing information onto or from an information recording medium, comprising the steps of recording, onto the information recording medium, history information representing that the information recording medium has been recorded at least once, reproducing the history information recorded on the information recording medium by the recording step, and controlling recording or reproduction of information onto or from the information recording medium in accordance with the history information reproduced by the reproduction step.

According to a yet further aspect of the present invention, there is provided a providing medium which provides a computer-readable program for causing an information recording and reproduction apparatus for recording or reproducing information onto or from an information recording medium to execute a process comprising the steps of recording, onto the information recording medium, history information representing that the information recording medium has been recorded at least once, reproducing the history information recorded on the information recording medium by the recording step, and controlling recording or reproduction of information onto or from the information recording medium in accordance with the history information reproduced by the reproduction step.

In the information recording and reproduction apparatus, the information recording and reproduction method and the providing medium, history information representing that the information recording medium has been recorded at least once is recorded onto the information recording medium, and the history information recorded on the information recording medium is reproduced, and then, recording or reproduction of information onto or from the information recording medium is controlled in accordance with the thus reproduced history information. Consequently, information of the information recording medium can be recorded onto or reproduced from the information recording medium only by the particular information recording and reproduction apparatus which corresponds to the information recording medium.

According to a yet further aspect of the present invention, there is provided an information recording medium for being loaded into an information reproduction apparatus so that information recorded on the information recording medium is reproduced by the information reproduction apparatus, comprising identification means in which identification information for identification of the information recording medium or the information reproduction apparatus is recorded.

With the information recording medium, since identification information for identification of the information recording medium or an information reproduction apparatus is recorded in the identification means, information recorded on the information recording medium can be reproduced only by the information reproduction apparatus which corresponds to the identification information.

According to a yet further aspect of the present invention, there is provided an information reproduction apparatus for reproducing information recorded on an information recording medium, the information recording medium including identification means in which identification information for identification of the information recording medium or an information reproduction apparatus for reproducing the information recording medium is recorded, comprising reproduction means for reproducing the identification information recorded in the identification means, and control means for controlling reproduction of information recorded on the information recording medium in accordance with the identification information reproduced by the reproduction means.

According to a yet further aspect of the present invention, there is provided an information reproduction method for reproducing information recorded on an information recording medium, the information recording medium including identification means in which identification information for identification of the information recording medium or an information reproduction apparatus for reproducing the information recording medium is recorded, comprising the steps of reproducing the identification information recorded in the identification means, and controlling reproduction of information recorded on the information recording medium in accordance with the identification information reproduced by the reproduction step.

According to a yet further aspect of the present invention, there is provided a providing medium which provides a computer-readable program for causing an information reproduction apparatus for reproducing information recorded on an information recording medium, which includes identification means in which identification information for identification of the information recording medium or an information reproduction apparatus for reproducing the information recording medium is recorded, to execute a process comprising the steps of reproducing the identification information recorded in the identification means, and controlling reproduction of information recorded on the information recording medium in accordance with the identification information reproduced by the reproduction step.

In the information reproduction apparatus, the information reproduction method and the providing medium, the identification information recorded in the identification means is reproduced, and reproduction of information recorded on the information recording medium is controlled in accordance with the reproduced identification information. Consequently, the information of the information recording medium can be reproduced only by the particular information reproduction apparatus which corresponds to the information recording medium.

According to a yet further aspect of the present invention, there is provided an information recording and reproduction apparatus for recording and reproducing information transmitted thereto onto an information recording medium together with information identification data, comprising storage means for storing the information identification data, recording means for recording the information identification data onto the information recording medium, reproduction means for reproducing the information identification data recorded on the information recording medium by the recording means, and control means for comparing the information identification data reproduced by the reproduction means with the information identification data stored in the storage means and controlling recording or reproduction onto or from the information recording medium in accordance with a result of the comparison.

According to a yet further aspect of the present invention, there is provided an information recording and reproduction method for recording and reproducing information transmitted thereto onto an information recording medium together with information identification data, comprising the steps of storing the information identification data, recording the information identification data onto the information recording medium, reproducing the information identification data recorded on the information recording medium by the recording step, and comparing the information identification data reproduced by the reproduction step with the information identification data stored by the storing step and controlling recording or reproduction onto or from the information recording medium in accordance with a result of the comparison.

According to a yet further aspect of the present invention, there is provided a providing medium which provides a computer-readable program for causing an information recording and reproduction apparatus for recording and reproducing information transmitted thereto onto an information recording medium together with information identification data to execute a process comprising the steps of storing the information identification data, recording the information identification data onto the information recording medium, reproducing the information identification data recorded on the information recording medium by the recording step, and comparing the information identification data reproduced by the reproduction step with the information identification data stored by the storing step and controlling recording or reproduction onto or from the information recording medium in accordance with a result of the comparison.

In the information recording and reproduction apparatus, the information recording and reproduction method and the providing medium, the information identification data is stored and then recorded onto the information recording medium, and the information identification data recorded on the information recording medium is reproduced. Then, the reproduced information identification data and the stored information identification data are compared with each other, and recording or reproduction onto or from the information recording medium is controlled in accordance with a result of the comparison. Consequently, information can be recorded onto or reproduced from the information recording medium only by the particular information recording and reproduction apparatus which corresponds to the information recording medium.

According to a yet further aspect of the present invention, there is provided a storage medium for being removably loaded into an information reproduction apparatus, having recorded thereon identification information of an information recording medium to be played back by the information reproduction apparatus and identification information of the information reproduction apparatus.

With the storage medium, since identification information of an information recording medium to be played back by an information reproduction apparatus and identification information of the information reproduction apparatus are stored thereon, information of the storage medium can be reproduced only by the predetermined information reproduction apparatus which has information corresponding to the identification information of the storage medium.

According to a yet further aspect of the present invention, there is provided an information recording and reproduction apparatus for accepting a removable storage medium in which first identification information for identification of an information recording medium and second identification information for identification of an information reproduction apparatus which reproduces the information recording medium are stored and reproducing information recorded on the information recording medium, comprising, storage means for storing third identification information for identification of the information reproduction apparatus, reproduction means for reproducing fourth identification means for identification of the information recording medium recorded on the information recording medium, and control means for comparing the fourth identification information reproduced by the reproduction means and the first identification information stored in the storage medium with each other and comparing the third identification information stored in the storage means and the second identification information stored in the storage medium with each other and for controlling reproduction of information recorded on the information recording medium in accordance with results of the comparisons According to a yet further aspect of the present invention, there is provided an information recording and reproduction method for an information reproduction apparatus for accepting a removable storage medium in which first identification information for identification of an information recording medium and second identification information for identification of an information reproduction apparatus which reproduces the information recording medium are stored and reproducing information recorded on the information recording medium, comprising the steps of storing third identification information for identification of the information reproduction apparatus, reproducing fourth identification information for identification of the information recording medium recorded on the information recording medium, and comparing the fourth identification information reproduced by the reproduction step and the first identification information stored in the storage medium with each other and comparing the third identification information stored in the storage step and the second identification information stored in the storage medium with each other and for controlling reproduction of information recorded on the information recording medium in accordance with results of the comparisons.

According to a yet further aspect of the present invention, there is provided a providing medium which provides a computer-readable program for causing an information recording and reproduction apparatus for accepting a removable storage medium in which first identification information for identification of an information recording medium and second identification information for identification of an information reproduction apparatus which reproduces the information recording medium are stored and reproducing information recorded on the information recording medium to execute a process comprising the steps of storing third identification information for identification of the information reproduction apparatus, reproducing fourth identification information for identification of the information recording medium recorded on the information recording medium, and comparing the fourth identification information reproduced by the reproduction step and the first identification information stored in the storage medium with each other and comparing the third identification information stored in the storage step and the second identification information stored in the storage medium with each other and for controlling reproduction of information recorded on the information recording medium in accordance with results of the comparisons.

With the information reproduction apparatus, the information reproduction method and the providing medium, third identification information for identification of the information reproduction apparatus is stored, and fourth identification information for identification of the information recording medium recorded on the information recording medium is reproduced. Further, the reproduced fourth identification information and the first identification information stored in the storage medium are compared with each other, and the stored third identification information and the second identification information stored in the storage medium are compared with each other. Then, reproduction of information recorded on the information recording medium is controlled in accordance with results of the comparisons. Consequently, the information of the information recording medium can be reproduced only by the particular information reproduction apparatus which corresponds to the storage medium and the information recording medium.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a schematic view showing a general construction of an embodiment of the present invention;

FIG. 3 is a schematic view showing a DVD (DVD-R) for use with the DVD player/recorder of FIG. 2;

FIG. 11 is a flow chart illustrating processing of the DVD player/recorder of FIG. 9 when it plays back a DVD to which a seal is adhered;

FIG. 14 is a flow chart illustrating processing of the DVD player/recorder of FIG. 12 when it reproduces a DVD composed of an upper layer portion and a lower layer portion and having a seal adhered thereto;

FIG. 23 is a flow chart illustrating processing of a DVD player/recorder shown in FIG. 21.

DETAILED DESCRIPTION OF THE PREFERRED EMBODIMENTS

Referring first to FIG. 1, there is shown a construction of an embodiment of the present invention. A DVD player/recorder 1 supplies a video signal to a monitor 2 and supplies an audio signal to a speaker 3. The monitor 2 reproduces an image based on the video signal supplied thereto from the DVD player/recorder 1. The speaker 3 reproduces sound based on the audio signal supplied thereto from the DVD player/recorder 1.

Figure 2:
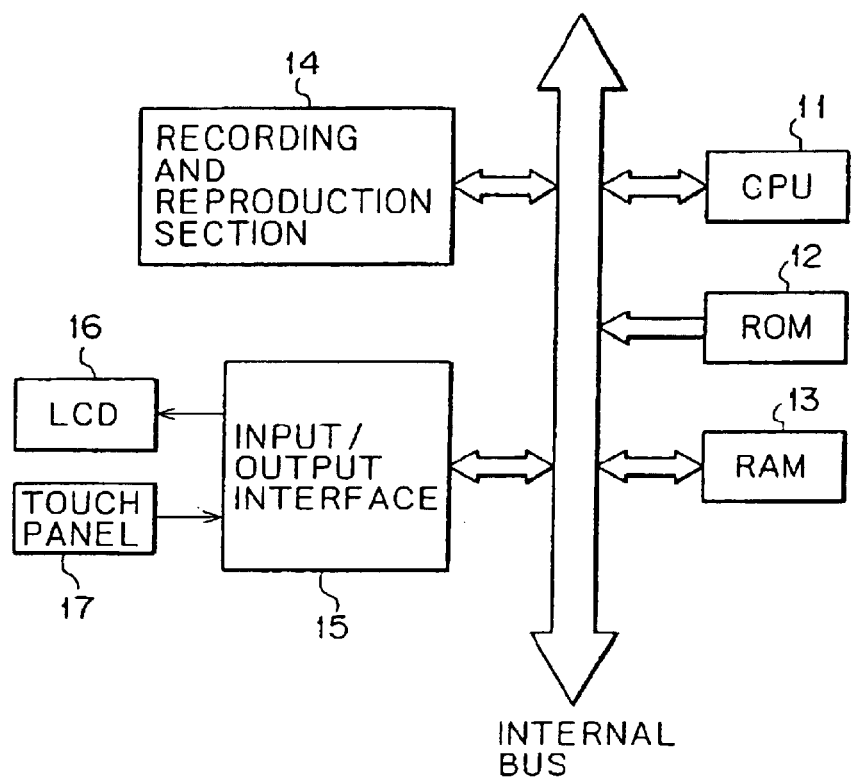
FIG. 2 is a block diagram showing a hardware construction of a DVD player/recorder shown in FIG. 1.

FIG. 2 shows a hardware construction of the DVD player/recorder 1. Referring to FIG. 2, the DVD player/recorder 1 includes a central processing unit (CPU) 11 which actually executes various programs. A read only memory (ROM) 12 stores basically fixed data of programs and calculation parameters to be used by the CPU 11 and an apparatus ID (Identification code) unique to the DVD player/recorder 1. A random access memory (RAM) 13 stores programs to be used for execution of the CPU 11 and parameters which suitably vary in the execution of the programs.

A recording and reproduction section 14 records or reproduces data onto or from a DVD (FIG. 3) loaded therein in response to an inputted signal. A liquid crystal display (LCD) 16 and a touch panel 17 are connected to an internal bus through an input/output interface 15. The LCD 16 displays display data supplied thereto from the CPU 11. The touch panel 17 supplies a signal corresponding to an operation of a user to the CPU 11 through the input/output interface 15.

The CPU 11, ROM 12, RAM 13, recording and reproduction section 14 and input/output interface 15 are connected to each other by the internal bus.

FIG. 3 shows a DVD which is an example of a recording medium which can be used in the present invention. Referring to FIG. 3, the DVD 4 shown has a partial ROM structure and has, in a region other than a read only region in which video data and audio data are recorded in advance, a recording track 21 onto which data representing that the disk has been read already or predetermined data such as the apparatus ID of the DVD player/recorder 1 can be written. The recording track 21 is formed of a cyanine dye or a phthalocyanine dye, and the dye is thermally decomposed by a laser beam of the recording and reproduction section 14. Thereupon, the interface between the thermally decomposed pigment and resin material therearound deforms thereby recording the data. Further, the DVD 4 has a disk ID unique to the DVD 4 recorded in some other predetermined region thereof.

Figure 4:
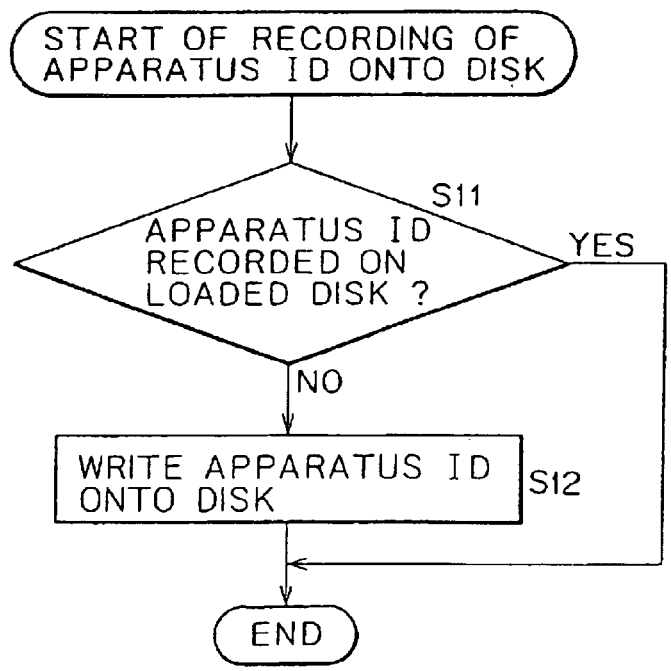
FIG. 4 is a flow chart illustrating processing of recording an apparatus ID of the DVD player/recorder of FIG. 2.

FIG. 4 is a flow chart illustrating processing of recording the apparatus ID of the DVD player/recorder 1 onto the DVD 4, which is executed when the DVD 4 is loaded into the DVD player/recorder 1. Referring to FIG. 4, in step S11, the CPU 11 controls the recording and reproduction section 14 to operate to read out data recorded on the recording track 21 of the DVD 4 loaded in the DVD player/recorder 1 and discriminates whether or not the DVD 4 is a disk on which the apparatus ID of the DVD 4 is recorded already. If it is determined that the DVD 4 is not a disk on which the apparatus ID of the DVD 4 is recorded, the procedure advances to step S12. In step S12, the CPU 11 controls the recording and reproduction section 14 to operate to write the apparatus ID stored in the ROM 12 onto the recording track 21 of the DVD 4, and then the processing is ended.

If it is determined in step S11 that the DVD 4 is a disk on which the apparatus ID is recorded already, then the processing in step S12 is skipped, and the processing is ended immediately. Consequently, the DVD 4 is protected against overlapping recording of apparatus IDs thereon.

Figure 5:
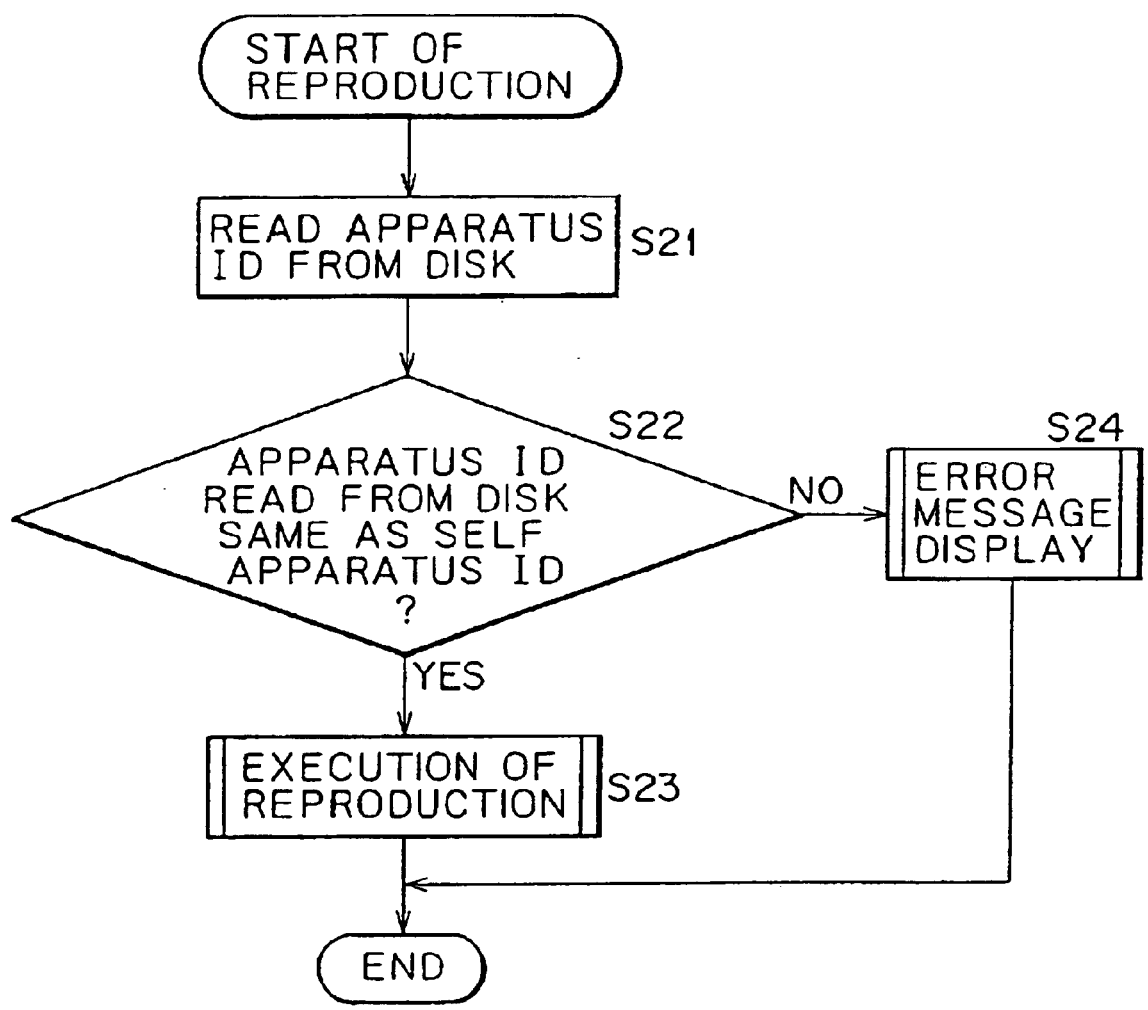
FIG. 5 is a flow chart illustrating reproduction operation of the DVD player/recorder of FIG. 2.

FIG. 5 is a flow chart illustrating reproduction operation of the DVD player/recorder 1. Referring to FIG. 5, in step S21, the CPU 11 controls the recording and reproduction section 14 to operate to read out the apparatus ID recorded on the recording track 21 of the DVD 4. In step S22, the CPU 11 discriminates whether or not the apparatus ID stored in the ROM 12 is same as the apparatus ID read out in step S21. If it is determined that the apparatus stored in the ROM 12 is same as the apparatus ID read out in step S21, then the CPU 11 controls the recording and reproduction section 14 to execute reproduction of the DVD 4 in step S23, and then the processing is ended.

If it is determined in step S22 that the apparatus ID stored in the ROM 12 is not same as the apparatus ID read out from the DVD 4, then the CPU 11 controls the LCD 16 to display a predetermined error message (for example, a message "This disk cannot be played back."), and then the processing is ended.

By the processing described above, the DVD 4 can be played back only by the DVD player/recorder 1 into which the DVD 4 is loaded for the first time.

Figure 6:
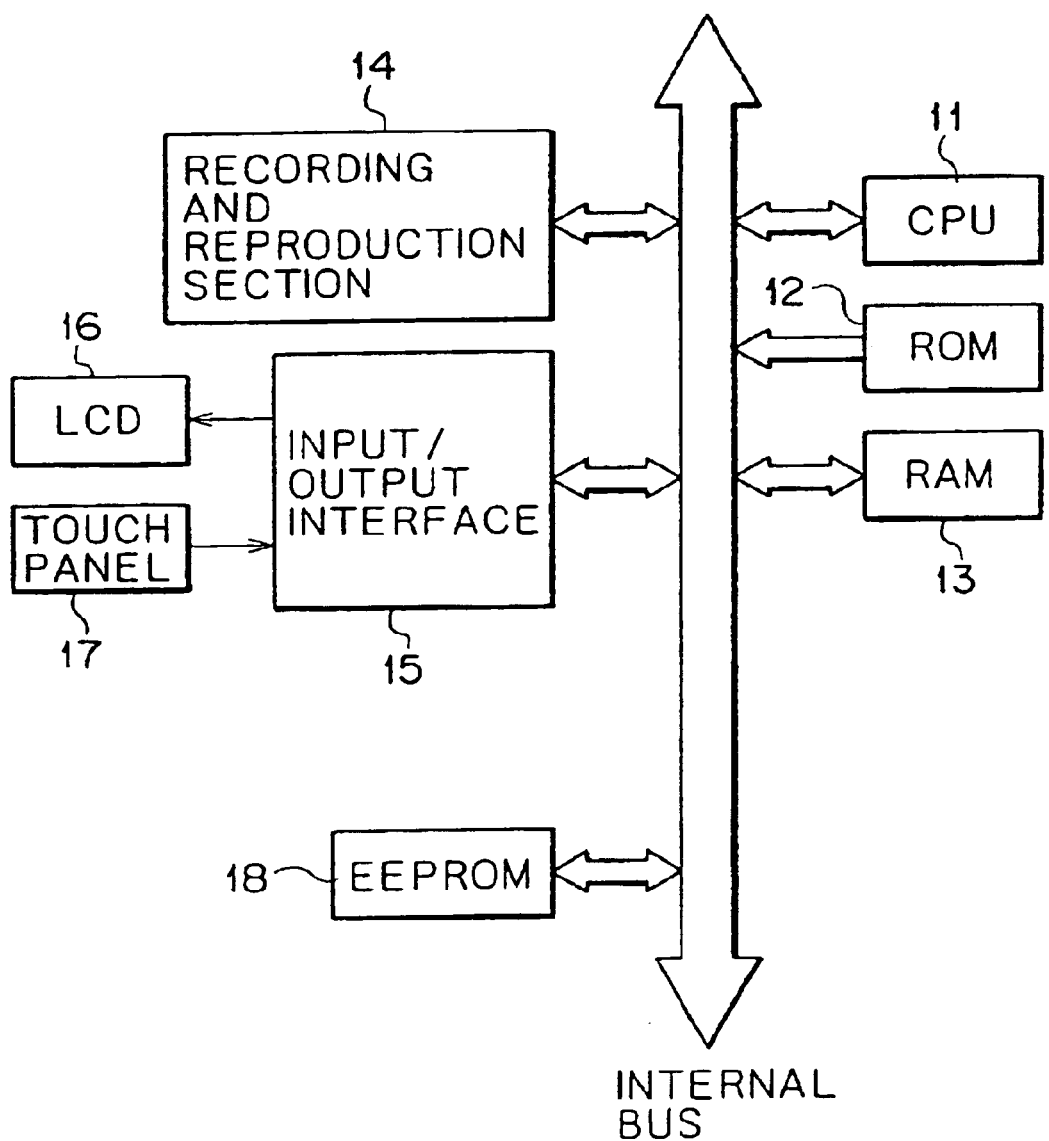
FIG. 6 is a block diagram showing another hardware construction of the DVD player/recorder shown in FIG. 1.

FIG. 6 shows another hardware construction of the DVD player/recorder 1. Referring to FIG. 6, the DVD player/recorder 1 shown is a modification to but is different from the DVD player/recorder 1 described hereinabove with reference to FIG. 2 in that it additionally includes an electrically erasable programmable read only memory (EEPROM) 18. While, of programs and calculation parameters to be used by the CPU 11, those basically fixed data are stored in the ROM 12, information which must be retained even after power supply is interrupted such as a disk ID is stored in the EEPROM 18.

Figure 7:
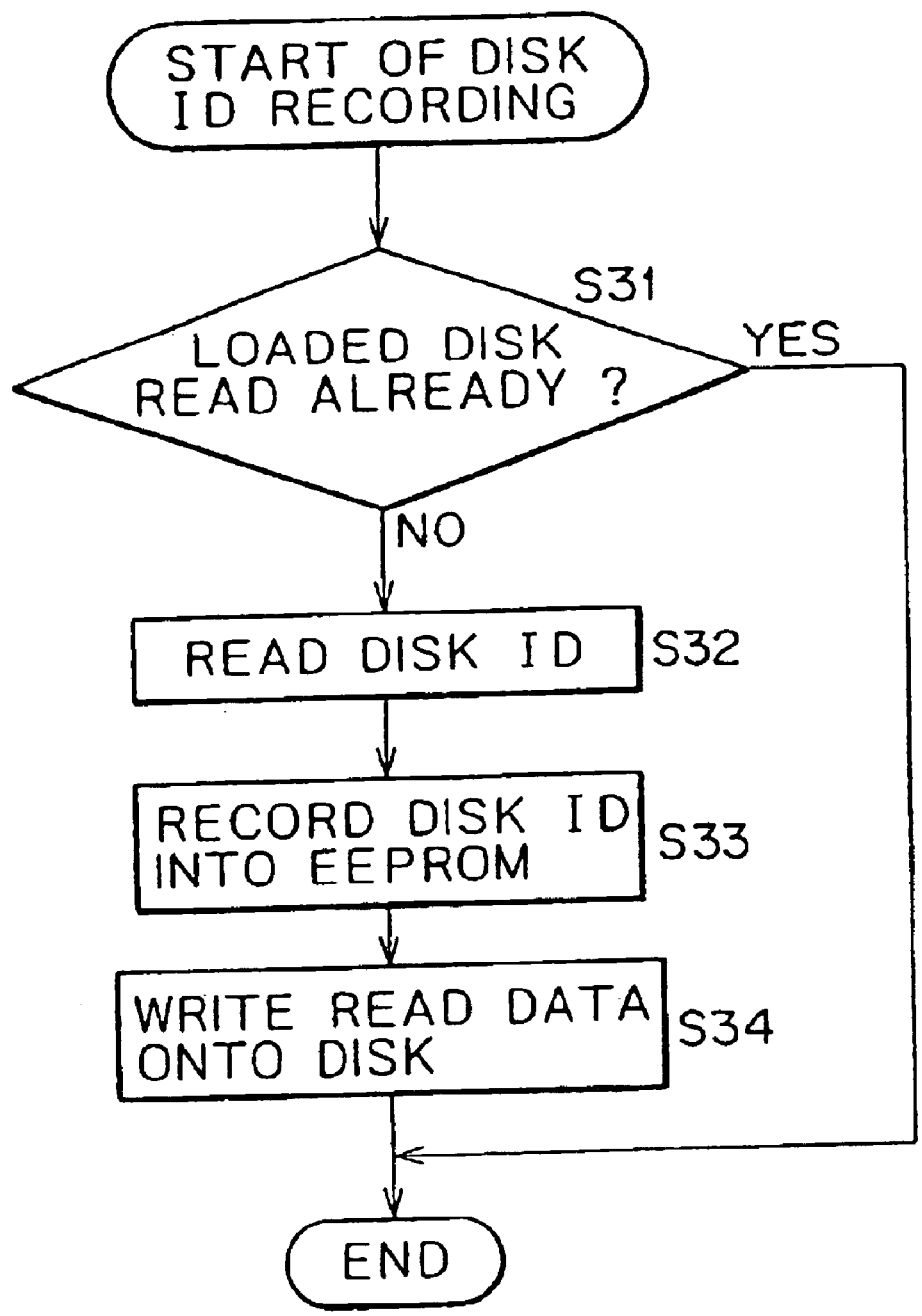
FIG. 7 is a flow chart illustrating processing of recording a disk ID into the DVD player/recorder of FIG. 6.

FIG. 7 is a flow chart illustrating processing of recording a disk ID onto the DVD player/recorder 1 of FIG. 6 when a DVD 4 is loaded into the DVD player/recorder 1. Referring to FIG. 7, in step S31, the CPU 11 controls the recording and reproduction section 14 to operate to read out data recorded on the recording track 21 of the DVD 4 loaded in the DVD player/recorder 1 and discriminates whether or not the DVD 4 is a disk which has been read already. If it is determined that the DVD 4 is not a disk which has been read already, then the procedure advances to step S32. In step S32, the CPU 11 controls the recording and reproduction section 14 to operate to read out the disk ID recorded in a predetermined region (read only region) of the DVD 4. In step S33, the CPU 11 stores the thus read out disk ID into the EEPROM 18. In step S34, the CPU 11 controls the recording and reproduction section 14 to operate to write data (a flag or a disk ID) representing that the DVD 4 is a disk which has been read already (has been played back at least once) onto the recording track 21 of the DVD 4, and then the processing is ended.

If it is determined in step S31 that the DVD 4 is a disk which has been read already, then the processing in steps S32 to S34 is skipped, and the processing is ended. Consequently, overlapping writing onto the recording track 21 of the DVD 4 is prevented, and the disk ID of the DVD 4 which has been played back at least once is prevented from being stored into the EEPROM 18 of any other DVD player/recorder 1.

Figure 8:
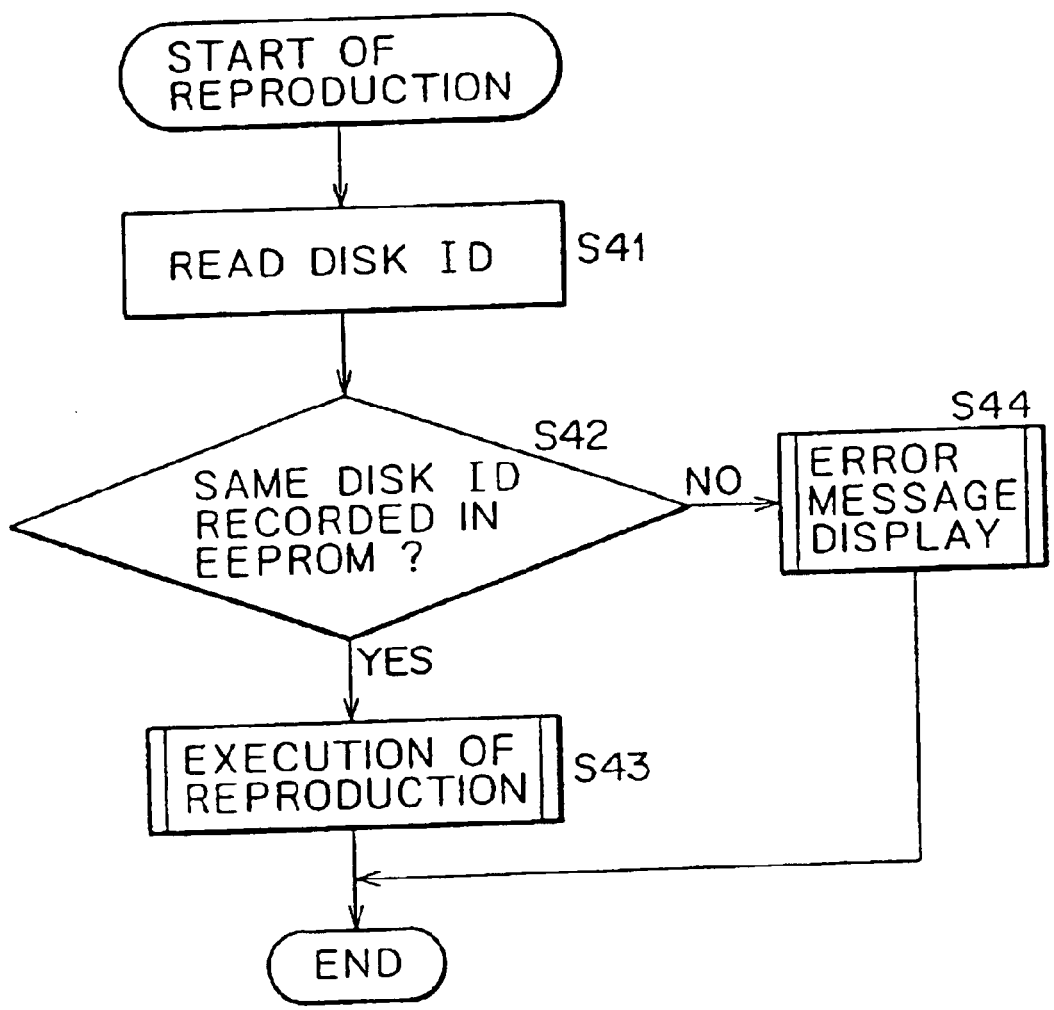
FIG. 8 is a flow chart illustrating processing of the DVD player/recorder of FIG. 6 which reproduces information recorded on a DVD.

FIG. 8 is a flow chart illustrating processing of the DVD player/recorder 1 of FIG. 6 when it reproduces information recorded on a DVD 4. Referring to FIG. 8, in step S41, the CPU 11 controls the recording and reproduction section 14 to operate to read out the disk ID recorded in a predetermined region (reproduction only region) of the DVD 4. Then in step S42, the CPU 11 discriminates whether or not the disk ID same as the disk ID read out in step S41 is recorded in the EEPROM 18. If it is determined that the disk ID same as the disk ID read out in step S41 is recorded in the EEPROM 18, then the CPU 11 controls the recording and reproduction section 14 to execute reproduction of the DVD 4 in step S43, and then the processing is ended.

If it is determined in step S42 that the disk ID same as the disk read out is not stored in the EEPROM 18, then the CPU 11 controls the LCD 16 to display an error message in step S44, and then the processing is ended.

As described above, information recorded on a DVD 4 can be utilized only by the DVD player/recorder 1 in which the disk ID of the DVD 4 is recorded (into which the DVD 4 has been loaded for the first time).

Figure 9:
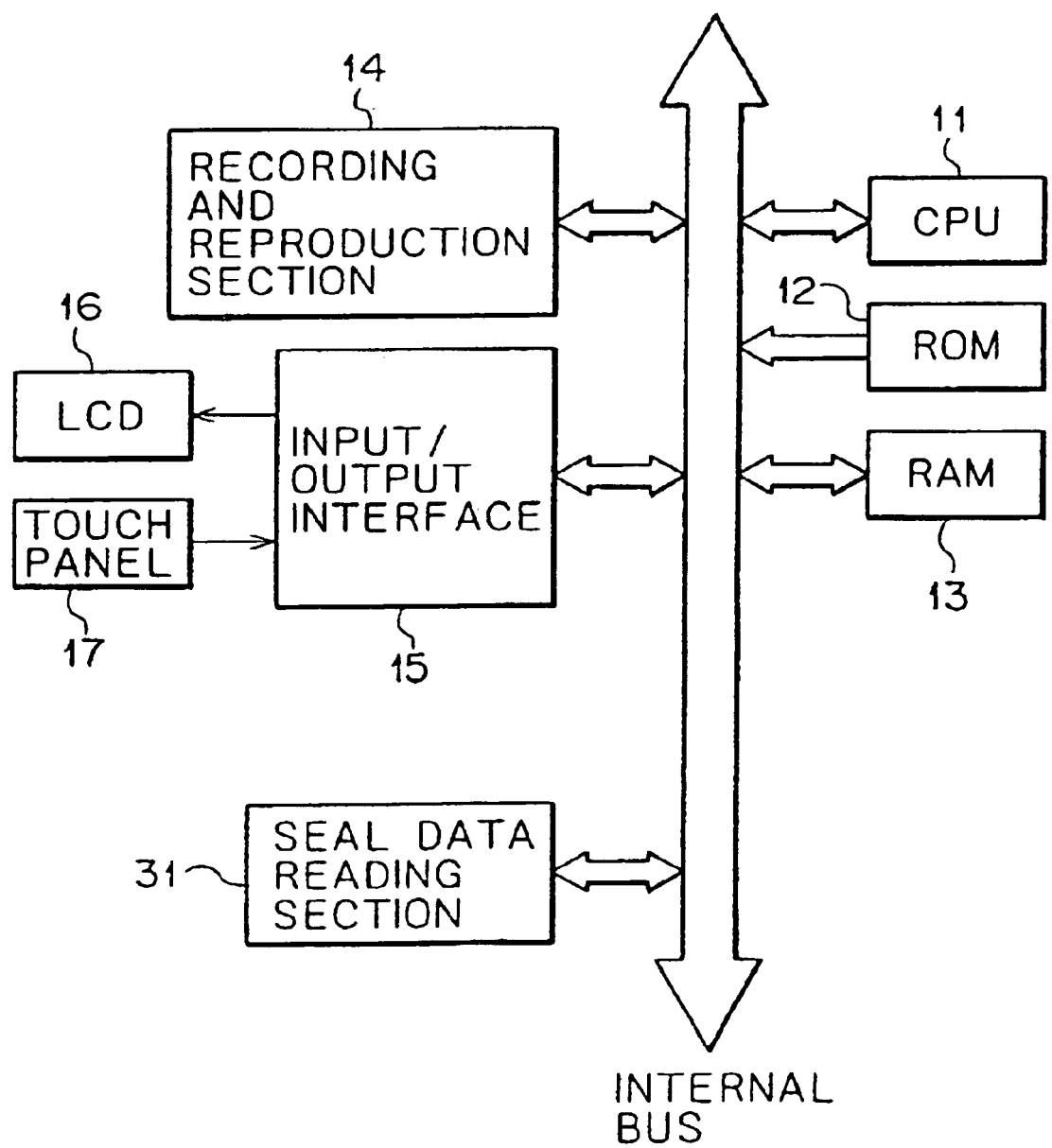
FIG. 9 is a block diagram showing a further hardware construction of the DVD player/recorder shown in FIG. 1.

FIG. 9 shows a further hardware construction of the DVD player/recorder 1. Referring to FIG. 9, the DVD player/recorder 1 shown is another modification to but is different from the DVD player/recorder 1 described hereinabove with reference to FIG. 2 only in that it additionally includes a seal data reading section 31. The seal data reading section 31 reads out a pattern of a bar code on the surface of a seal 41 adhered to the DVD 4.

Figure 10:
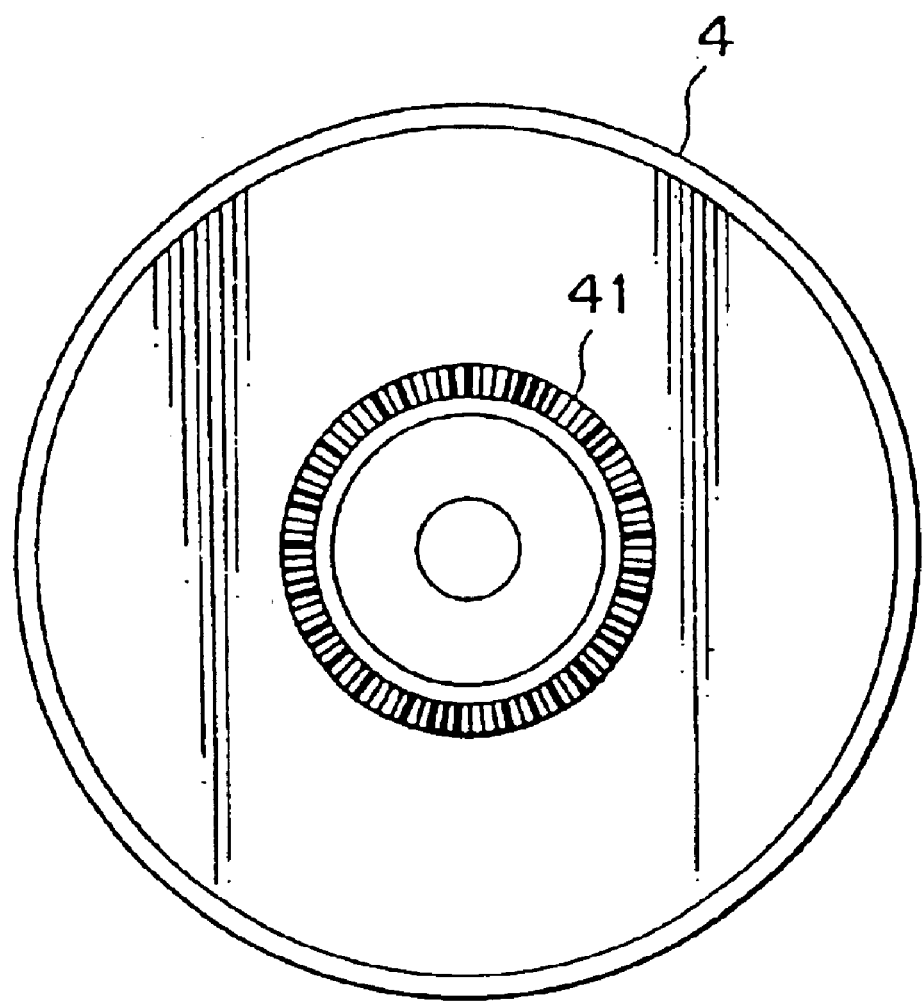
FIG. 10 is a schematic view showing another DVD for use with the DVD player/recorder of FIG. 9.

FIG. 10 shows a form of the DVD 4 which can be used in the DVD player/recorder 1 of FIG. 9. Referring to FIG. 10, the DVD 4 has an annular seal 41 adhered thereto which is centered at an axis of rotation of the DVD 4. A user of the DVD player/recorder 1 notifies, when the DVD 4 is bought, a dealer of the DVD 4 of the apparatus ID of the DVD player/recorder 1 (the apparatus ID may be recorded into and conveyed with a memory card or the like). The dealer adheres, to the DVD 4, a seal 41 on which a bar code corresponding to the apparatus ID of the DVD player/recorder 1 is printed, and delivers the DVD 4 to the user of the DVD player/recorder 1. If the seal 41 is peeled off once, then it cannot be adhered to the DVD 4 again.

FIG. 11 is a flow chart illustrating processing of the DVD player/recorder 1 when it reproduces the DVD 4 to which the seal 41 is adhered. Referring to FIG. 11, in step S51, the CPU 11 discriminates whether or not a DVD 4 is loaded in the recording and reproduction section 14 of the DVD player/recorder 1. If it is determined that no DVD 4 is loaded, then the procedure returns to step S51 so that the processing in step S51 is repeated until a DVD 4 is loaded.

If it is determined in step S51 that a DVD 4 is loaded, then the procedure advances to step S52, in which the seal data reading section 31 reads the bar code of the seal 41 of the DVD 4 and sends a result of the reading to the CPU 11. In step S53, the CPU 11 discriminates whether or not data same as the bar code of the seal 41 is stored in the ROM 12. If it is determined that data same as the bar code of the seal 41 is stored in the ROM 12, then the procedure advances to step S54, in which the recording and reproduction section 14 executes playback of the DVD 4. Then, the processing is ended.

If it is determined in step S53 that data same as the bar code of the seal 41 is not stored in the ROM 12, then the procedure advances to step S55, in which the CPU 11 controls the LCD 16 to display a predetermined error message, whereafter the processing is ended.

In this manner, the DVD 4 cannot be reproduced by a DVD player/recorder other than the DVD player/recorder 1 which has the apparatus ID corresponding to the bar code of the seal 41.

Figure 12:
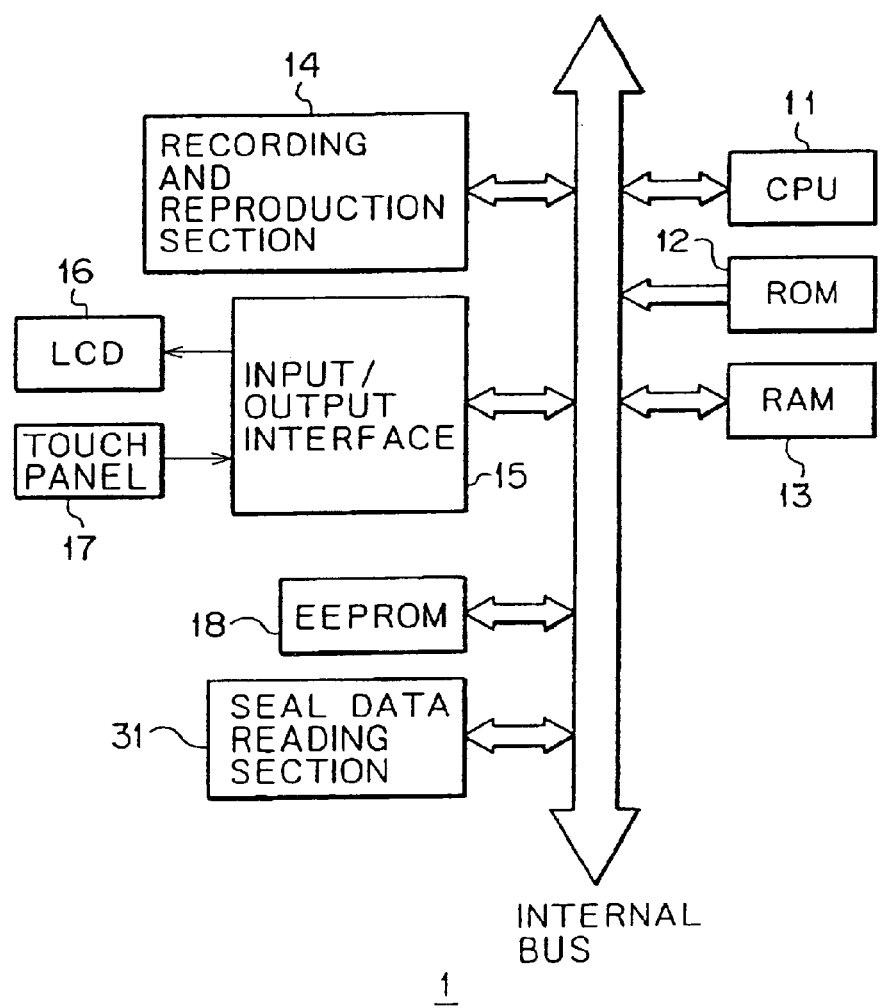
FIG. 12 is a block diagram showing a still further hardware construction of the DVD player/recorder shown in FIG. 1.

FIG. 12 shows a still further hardware construction of the DVD player/recorder 1 shown in FIG. 1. Referring to FIG. 12, the DVD player/recorder 1 shown is a modification to but is different from the DVD player/recorder 1 described hereinabove with reference to FIG. 2 in that it additionally includes an EEPROM 18 similar to that described hereinabove with reference to FIG. 6 and a seal data reading section 31 similar to that described hereinabove with reference to FIG. 9. However, the seal data reading section 31 here reads a pattern of a bar code printed on the surface of such a seal 41 adhered to a DVD 4 as shown in FIGS. 13A to 13C and outputs data of the pattern.

Figure 13A:
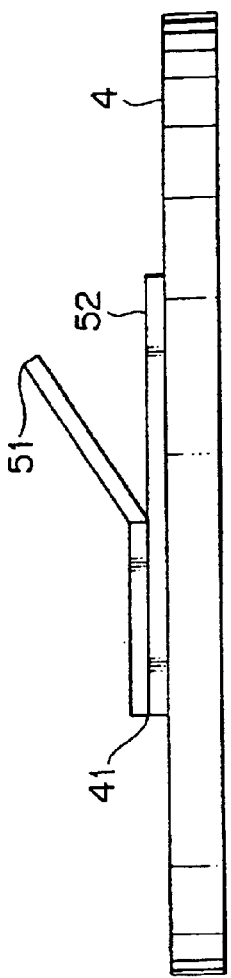
FIGS. 13A to 13C are schematic views showing a structure of another seal when a DVD is viewed from the side.
Figure 13B:
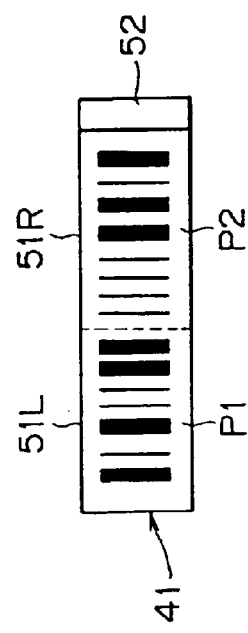
Figure 13C:
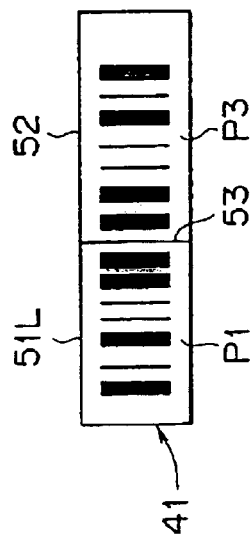

FIGS. 13A to 13C show a structure of the seal 41 adhered to a DVD 4 to be reproduced on the DVD player/recorder 1 of FIG. 12. Referring to FIGS. 13A to 13C, the seal 41 has a bar code printed thereon which corresponds to the apparatus ID of the DVD player/recorder 1 similarly to that of FIG. 10, and is adhered to the DVD 4 by a dealer. As particularly seen from FIG. 13A, the seal 41 includes a lower payer portion 52 adhered to the DVD 4, and an upper layer portion 51 pasted on the lower payer portion 52 such that it can be partially peeled off by a user. Once the upper layer portion 51 is peeled off, it cannot be pasted on the lower payer portion 52 again. FIG. 13B shows a pattern of the bar code of the seal 41 before the upper layer portion 51 is partially peeled off. On the surface of the seal 41, a pattern P1 of a left half 51L of the upper layer portion 51 and a pattern P2 of a right half 51R of the upper layer portion 51 appear.

FIG. 13C shows the seal 41 wherein the upper layer portion 51 is partially peeled off. If the upper layer portion 51 is peeled off, then the upper layer portion 51 is cut away at the position of a predetermined break 53. In this condition, on the surface of the seal 41, the pattern P1 of the left half 51L of the upper layer portion 51 and a pattern P3 of the right-hand half of the lower payer portion 52 appear. The seal data reading section 31 of the DVD player/recorder 1 reads the pattern on the surface of the upper layer portion 51 or the lower payer portion 52 and outputs data corresponding to the pattern.

FIG. 14 illustrates processing of the DVD player/recorder 1 of FIG. 12 when it reproduces a DVD 4 to which a seal 41 which includes the upper layer portion 51 and the lower payer portion 52 is adhered. Referring to FIG. 14, in step S71, the recording and reproduction section 14 of the DVD player/recorder 1 discriminates whether or not a DVD 4 is loaded therein. If it is determined that no DVD 4 is loaded, then the procedure returns to step S71 to repeat the processing until a DVD 4 is loaded.

If it is determined in step S71 that a DVD 4 is loaded, then the procedure advances to step S72, in which the seal data reading section 31 reads data of the seal 41 and sends it to the CPU 11. In step S73, the CPU 11 discriminates whether or not the data read in step S72 is data of the upper layer portion 51. If it is determined that the data read is data of the upper layer portion 51, then the procedure advances to step S74. In step S74, the CPU 11 discriminates whether or not the seal data reading section 31 detects the break 53 of the seal 41. If it is determined that the break 53 of the seal 41 is not detected, then the procedure advances to step S75.

In step S75, the seal data reading section 31 reads out the pattern (pattern P1 and pattern P2) printed on the surface of the upper layer portion 51 and stores corresponding data into the EEPROM 18. In step S76, the recording and reproduction section 14 unloads the DVD 4. In step S77, the CPU 11 controls the LCD 16 to display a message representing that the DVD 4 should be loaded again after the upper layer portion 51 of the seal 41 is peeled off, whereafter the procedure returns to step S71.

If the user peels off the upper layer portion 51 and loads the DVD 4 again in accordance with the displayed message, then the pattern P3 of the lower payer portion 52 is read by the seal data reading section 31 in step S72. As a result, in step S73, it is discriminated that the read pattern is not the patterns P1 and P2 of the upper layer portion 51, and the procedure advances to step S78, in which the CPU 11 discriminates whether or not data same as the data corresponding to the pattern P1 of the upper layer portion 51 and the pattern P3 of the lower payer portion 52 read out in step S72 is stored in the EEPROM 18. If it is determined that data same as the data corresponding to the pattern P1 of the upper layer portion 51 and the pattern P3 of the lower payer portion 52 is stored in the EEPROM 18, then the procedure advances to step S79, in which the recording and reproduction section 14 executes playback of the DVD 4, whereafter the processing is ended.

If it is determined in step S78 that data same as the data corresponding to the pattern P1 of the upper layer portion 51 and the pattern P3 of the lower payer portion 52 is not stored in the EEPROM 18 or if it is discriminated in step S74 that the break 53 is present on the seal 41 (in such a case that the user re-pastes the seal 41 peeled off once), the procedure advances to step S80, in which the CPU 11 controls the LCD 16 to display a predetermined error message, whereafter the processing is ended.

As described above, the DVD 4 cannot be played back by a DVD player/recorder other than the predetermined DVD player/recorder 1 in which data corresponding to the pattern P1 of the upper layer portion 51 and the pattern P2 of the lower payer portion 52 of the seal 41 of the DVD 4 are recorded. Further, the DVD player/recorder 1 does not play back a DVD 4 wherein the upper layer portion 51 remains on the seal 41.

Figure 15:
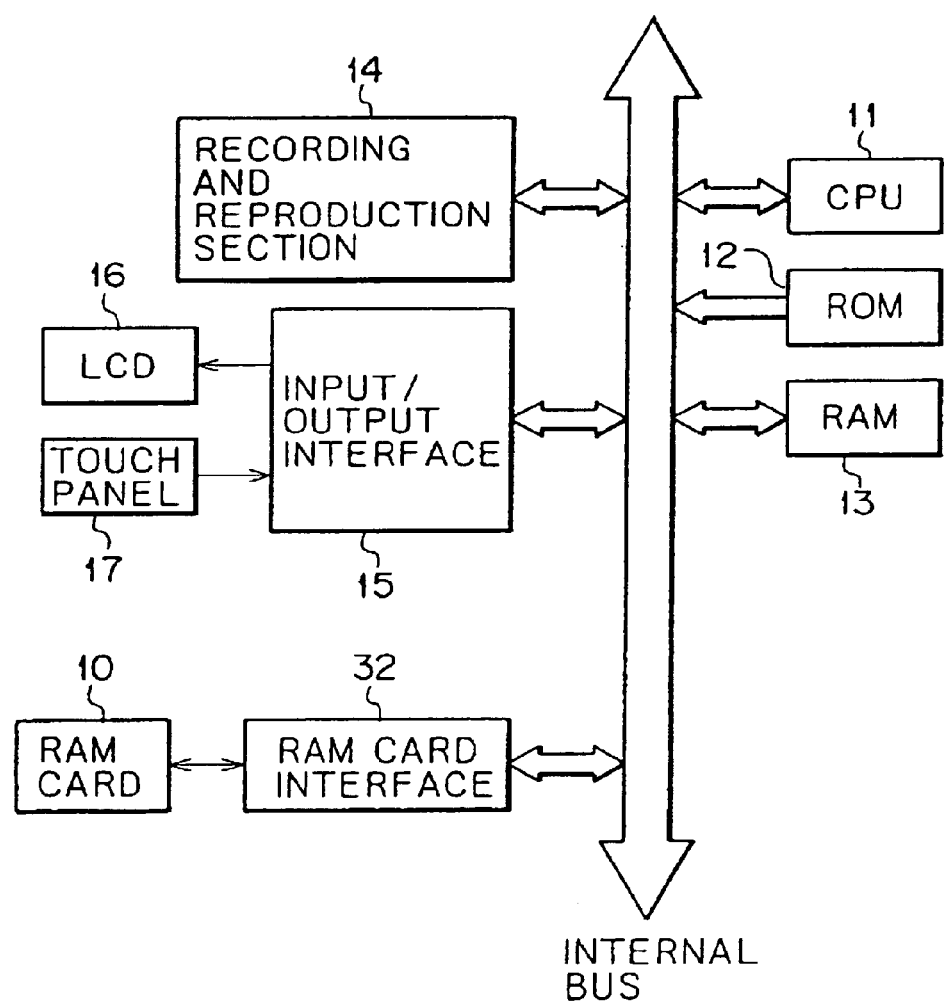
FIG. 15 is a block diagram showing a yet further hardware construction of the DVD player/recorder shown in FIG. 1.

FIG. 15 shows a yet further hardware construction of the DVD player/recorder 1 shown in FIG. 1. Referring to FIG. 15, the DVD player/recorder 1 shown is a modification to but is different from the DVD player/recorder 1 described hereinabove with reference to FIG. 2 in that it additionally includes a removable RAM card 10 and a RAM card interface 32. The RAM card 10 is connected to the internal bus through the RAM card interface 32. A user of the DVD player/recorder 1 informs, when the user buys a DVD 4, the dealer of the DVD 4 of the apparatus ID of the DVD player/recorder 1. The dealer stores the disk ID of the DVD 4 to be bought and the apparatus ID of the DVD player/recorder 1 into the RAM card 10 and delivers it together with the DVD 4 to the user of the DVD player/recorder 1 (buyer of the DVD 4).

The user of the DVD player/recorder 1 loads, when the DVD 4 is to be reproduced, the RAM card 10 corresponding to the DVD 4 (RAM card 10 in which the disk ID of the DVD 4 and the apparatus ID of the DVD player/recorder 1 are stored) is loaded into the DVD player/recorder 1 so that reproduction may be performed. The DVD player/recorder 1 executes reproduction only when the disk ID stored in the RAM card 10 and the disk ID of the DVD 4 coincide with each other and the apparatus ID stored in the RAM card 10 and the apparatus ID of the DVD player/recorder 1 coincide with each other, but in any other case, the DVD player/recorder 1 does not execute reproduction but displays an error message on the LCD 16.

In this manner, the DVD 4 cannot be played back by a DVD player/recorder other than the DVD player/recorder 1 which has the apparatus ID stored in the RAM card 10.

Figure 16:
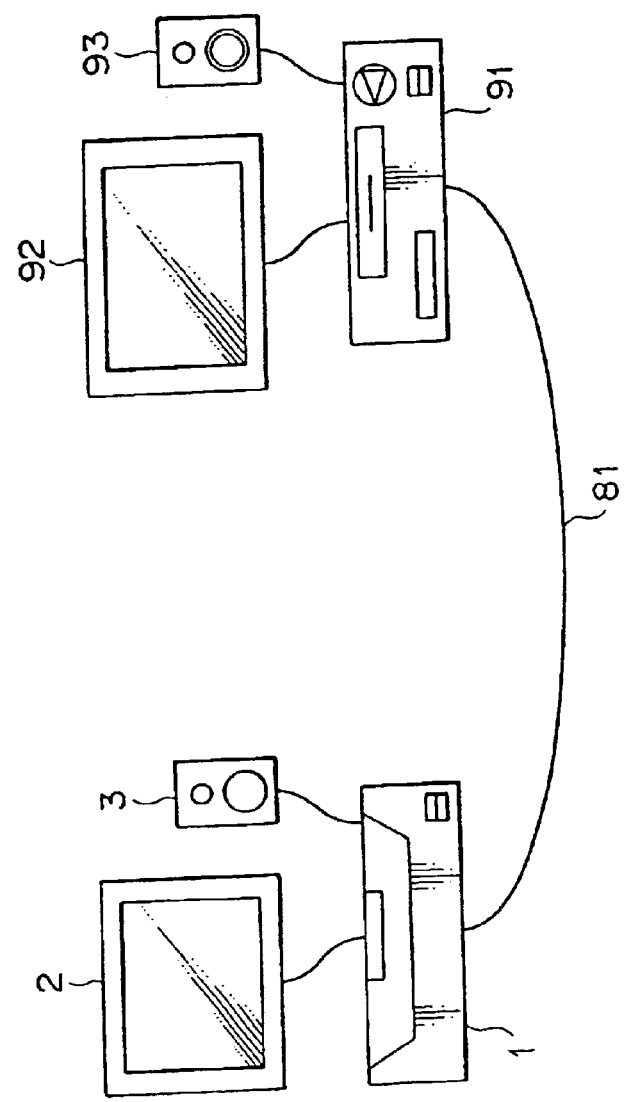
FIG. 16 is a schematic view showing a general construction of another embodiment of the present invention.

FIG. 16 shows a construction of another embodiment of the present invention. Referring to FIG. 16, the present embodiment includes a DVD player/recorder 1, a monitor 2 and a speaker 3 similar to those of the embodiment described hereinabove with reference to FIG. 1. The present embodiment further includes a DVD player 91 which supplies a video signal to a monitor 92 and supplies an audio signal to a speaker 93. The monitor 92 reproduces an image based on the video signal supplied thereto from the DVD player 91. The speaker 93 reproduces sound based on the audio signal supplied thereto from the DVD player 91.

The DVD player 91 and the DVD player/recorder 1 are connected to each other by an IEEE 1394 serial bus 81.

Figure 17:
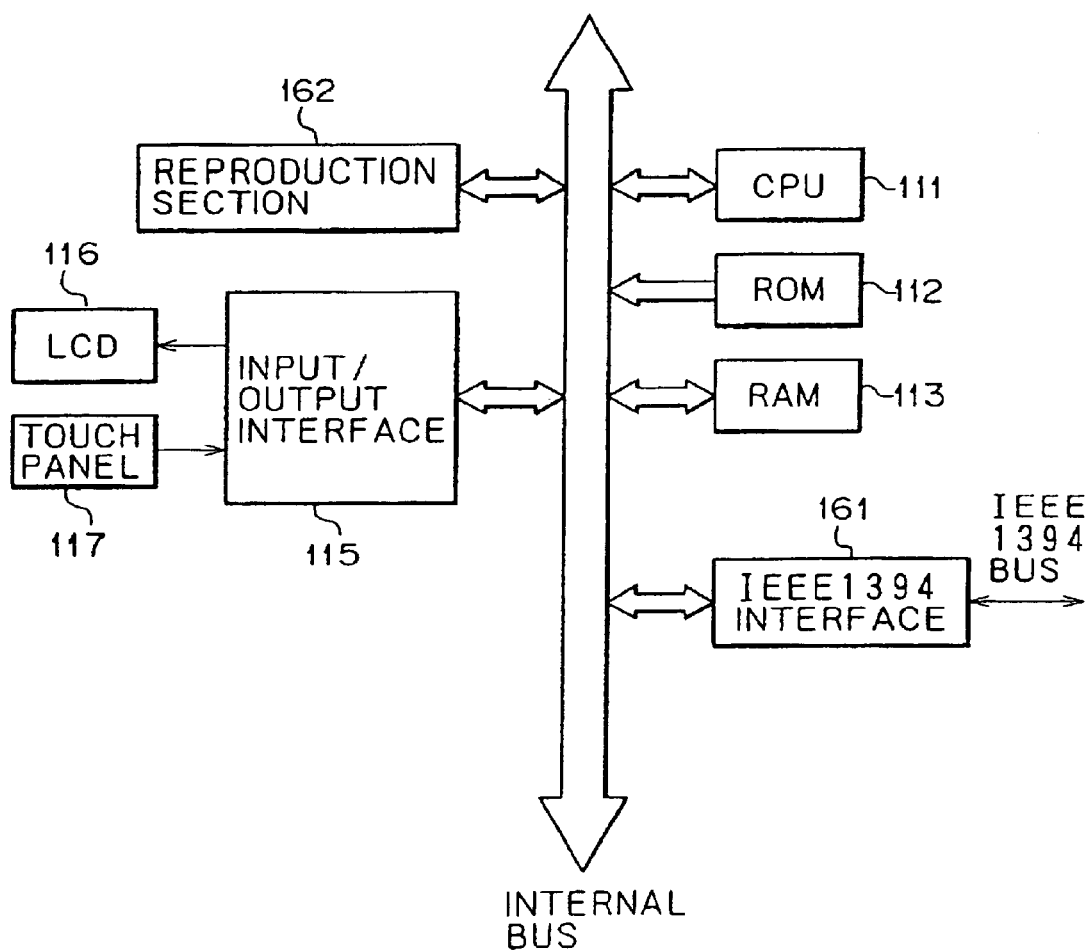
FIG. 17 is a block diagram showing a hardware construction of a DVD player shown in FIG. 16.

FIG. 17 shows a hardware construction of the DVD player 91. Referring to FIG. 17, the DVD player 91 shown includes a CPU 111, a ROM 112, a RAM 113, an input/output interface 115, a LCD 116, and a touch panel 117 similar to the CPU 11, ROM 12, RAM 13, input/output interface 15, LCD 16 and touch panel 17 of the DVD player/recorder 1 described hereinabove with reference to FIG. 2, respectively. The DVD player 91 further includes a reproduction section 162 which reproduces data recorded on a DVD 4 loaded therein, and an IEEE 1394 interface 161 serving as an input/output interface according to the IEEE 1394 to which the IEEE 1394 serial bus 81 is connected. The reproduction section 162, IEEE 1394 interface 161, CPU 111, ROM 112, RAM 113 and input/output interface 115 are connected to each other by an internal bus.

Figure 18:
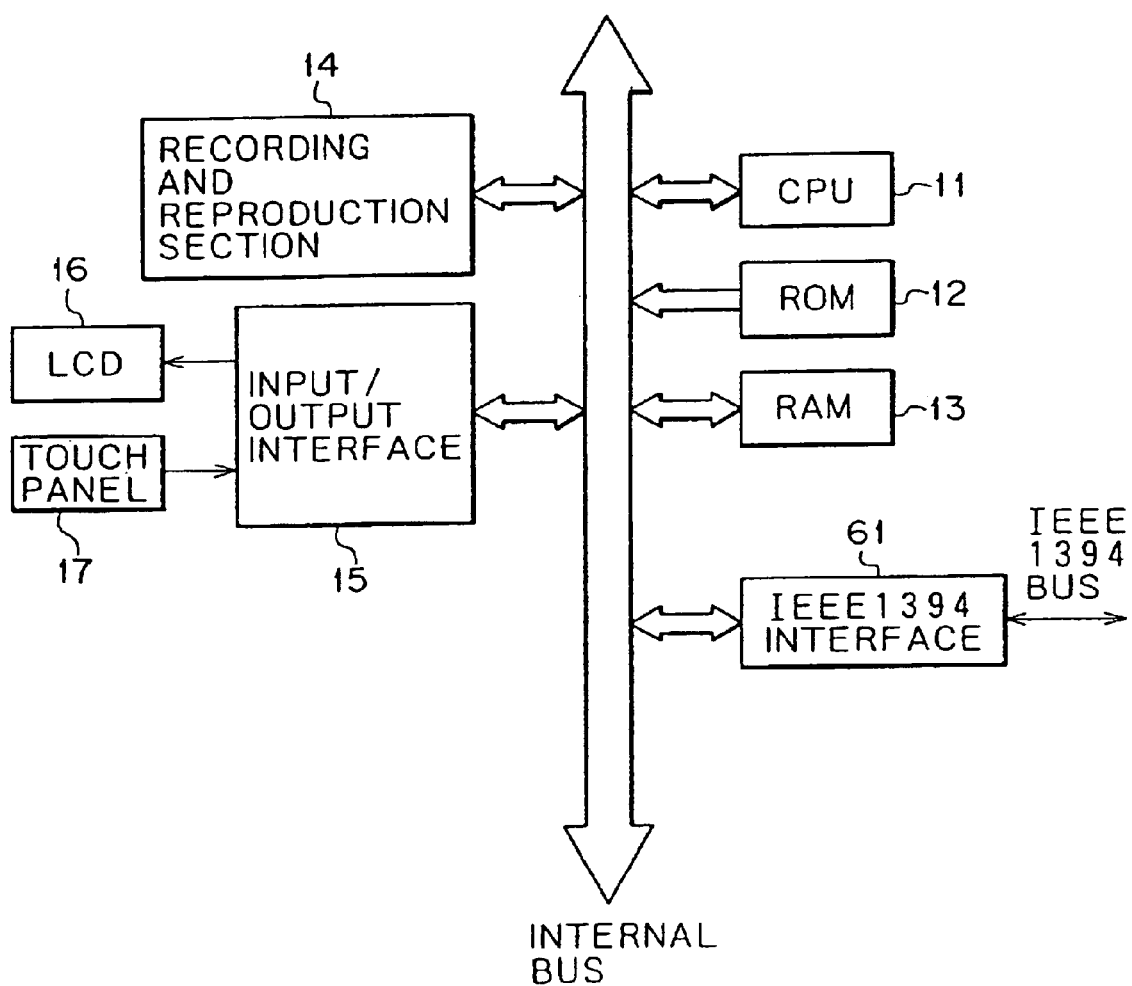
FIG. 18 is a block diagram showing a hardware construction of a DVD player/recorder shown in FIG. 16.

FIG. 18 shows a hardware construction of the DVD player/recorder 1 shown in FIG. 16. Referring to FIG. 18, the DVD player/recorder 1 shown includes a CPU 11, a ROM 12, a RAM 13, a recording and reproduction section 14, an input/output interface 15, an LCD 16 and a touch panel 17 similar to those of the DVD player/recorder 1 described hereinabove with reference to FIG. 2, respectively. The DVD player/recorder 1 further includes an IEEE 1394 interface 61 serving as an input/output interface according to the IEEE 1394 to which the IEEE 1394 serial bus 81 is connected. The CPU 11, ROM 12, RAM 13, recording and reproduction section 14, input/output interface 15 and IEEE 1394 interface 61 are connected to each other by an internal bus.

Figure 19:
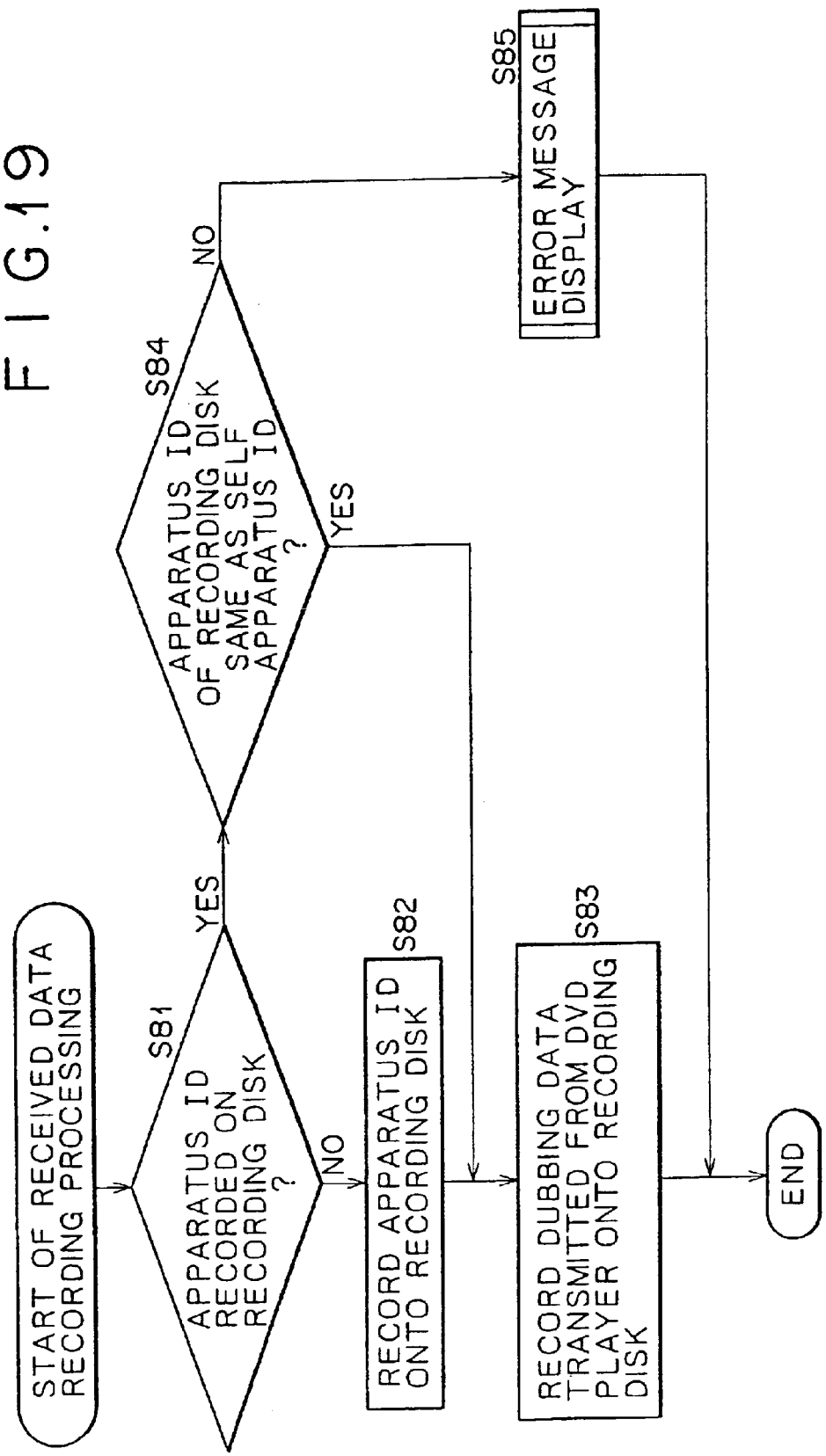
FIG. 19 is a flow chart illustrating recording operation of the DVD player/decoder of FIG. 18.

FIG. 19 is a flow chart illustrating operation of the DVD player/recorder 1 of FIG. 18 when contents recorded on a DVD 4 loaded in the DVD player 91 are recorded onto a recordable DVD 4 loaded in the DVD player/recorder 1. Referring to FIG. 19, in step S81, the recording and reproduction section 14 reads out data in a predetermined region of the DVD 4 for recording loaded in the DVD player/recorder 1 and discriminates whether or not an apparatus ID of the DVD 4 has been recorded already. If it is determined that the apparatus ID of the DVD 4 has not been recorded as yet, then the procedure advances to step S82, in which the CPU 11 controls the recording and reproduction section 14 to operate to record the apparatus ID stored in the ROM 12 into a predetermined region of the DVD 4 for recording loaded therein. Then in step S83, the recording and reproduction section 14 records data recorded on the DVD 4 loaded in the DVD player 91 and received by the IEEE 1394 interface 61 over the IEEE 1394 serial bus 81 onto the DVD 4 loaded in the DVD player/recorder 1, and then the processing is ended.

If it is determined in step S81 that the apparatus ID of the DVD 4 has been recorded already, then the procedure advances to step S84. In step S84, the CPU 11 discriminates whether or not the apparatus ID recorded in the predetermined region of the DVD 4 for recording loaded in the DVD player/recorder 1 and the apparatus ID stored in the ROM 12 are same as each other. If it is determined that the apparatus ID recorded in the predetermined region of the DVD 4 and the apparatus ID stored in the ROM 12 are same as each other, then the procedure advances to step S83.

If it is determined that the apparatus ID recorded in the predetermined region of the DVD 4 and the apparatus ID stored in the ROM 12 are not same as each other in step S84, then the procedure advances to step S85, in which the CPU 11 controls the LCD 16 to display an error message, whereafter the processing is ended.

If it is tried to execute such reproduction processing as illustrated in FIG. 15 for the DVD 4 onto which the data are recorded by the processing of FIG. 19, then reproduction is performed by the DVD player/recorder 1 by which the data have been recorded, but no reproduction is performed by any other DVD player/recorder than the DVD player/recorder 1 which has recorded the data. Further, where the apparatus ID of the DVD 4 loaded has been recorded already, the DVD player/recorder 1 does not perform recording if the apparatus ID stored in the ROM 12 and the apparatus ID recorded on the DVD 4 do not coincide with each other.

Figure 20:
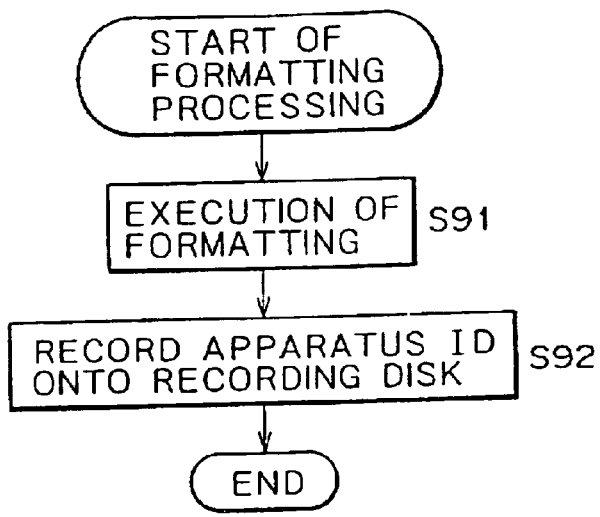
FIG. 20 is a flow chart illustrating processing of the DVD player/decoder of FIG. 18 when it formats a DVD.

FIG. 20 is a flow chart illustrating processing of the DVD player/recorder 1 when it formats a DVD 4. Referring to FIG. 20, in step S91, the recording and reproduction section 14 executes formatting of the DVD 4 loaded therein. In step S92, the CPU 11 controls the recording and reproduction section 14 to operate to record the apparatus ID stored in the ROM 12 onto the DVD 4, and then the processing is ended.

Reproduction of the DVD 4 formatted by the processing of FIG. 20 is executed by execution of the reproduction processing of FIG. 5 by the DVD player/recorder 1 which has executed the formatting. However, reproduction of the DVD 4 is not executed by any DVD player/recorder other than the DVD player/recorder 1 which has executed the formatting.

Figure 21:
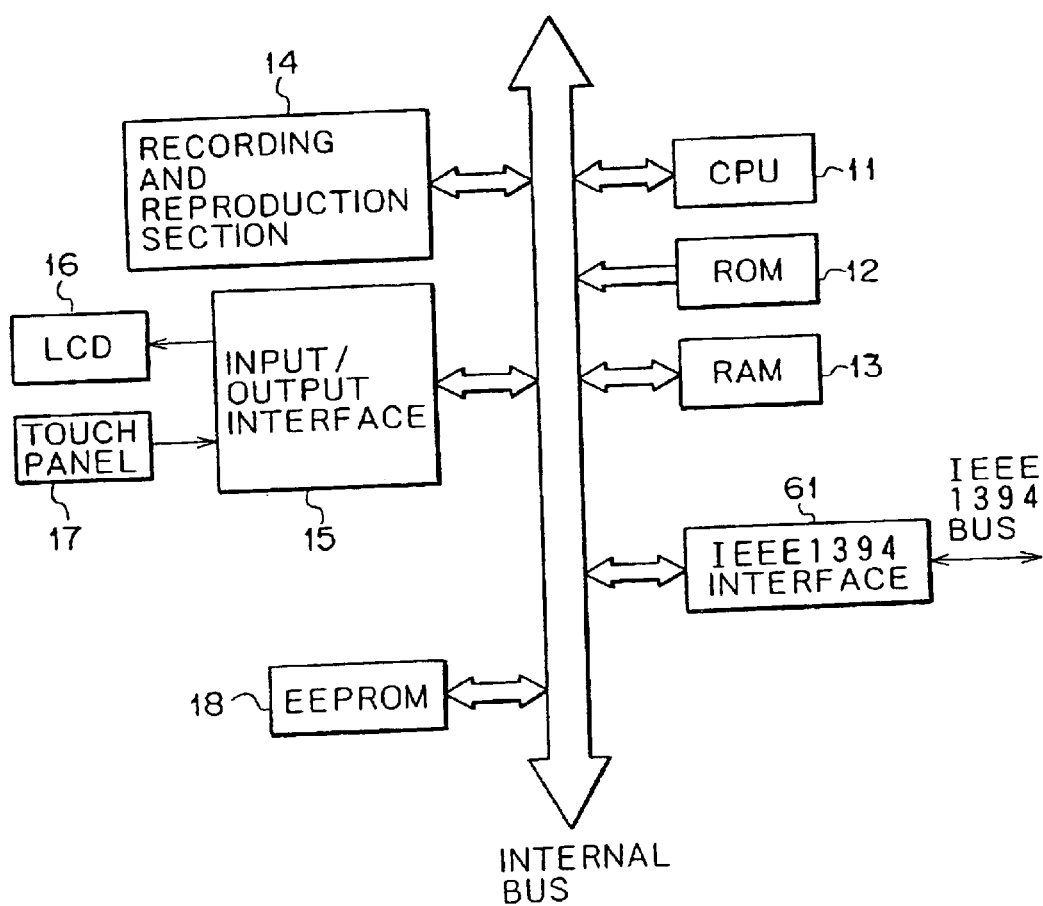
FIG. 21 is a block diagram showing another hardware construction of the DVD player/recorder shown in FIG. 16.

FIG. 21 shows another hardware construction of the DVD player/recorder 1 described hereinabove with reference to FIG. 16. Referring to FIG. 21, the DVD player/recorder 1 shown is a modification to but is different from the DVD player/recorder 1 described hereinabove with reference to FIG. 18 in that it additionally includes an EEPROM 18 similar that that of the DVD player/recorder 1 described hereinabove with reference to FIG. 6.

Figure 22:
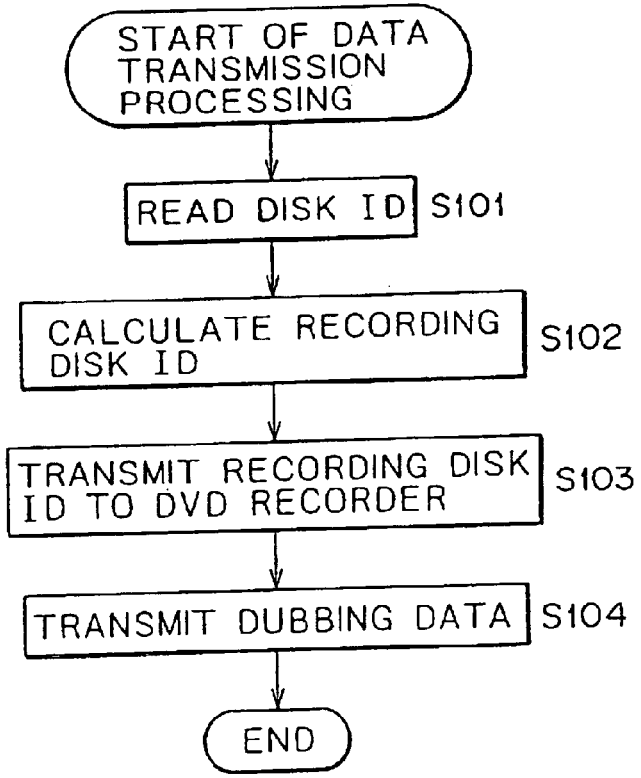
FIG. 22 is a flow chart illustrating processing of a DVD player shown in FIG. 21.

FIG. 22 is a flow chart illustrating processing of the DVD player 91 when contents recorded on a DVD 4 loaded in the DVD player 91 are transmitted and recorded onto another DVD 4 for recording loaded in the DVD player/recorder 1 of FIG. 21. Referring to FIG. 22, in step S101, the reproduction section 162 of the DVD player 91 reads out the disk ID of the DVD 4 loaded in the DVD player 91 and sends the disk ID to the CPU 111. In step S102, the CPU 111 calculates a recording disk ID in accordance with a predetermined calculation expression based on the disk ID received from the reproduction section 162. In step S103, the IEEE 1394 interface 161 transmits the recording disk ID calculated in step S102 to the DVD player/recorder 1 over the IEEE 1394 serial bus 81. In step S104, the IEEE 1394 interface 161 transmits data of the DVD 4 read out by the reproduction section 162 to the DVD player/recorder 1 over the IEEE 1394 serial bus 81.

FIG. 23 is a flow chart illustrating processing of the DVD player/recorder 1 when the contents received from the DVD player 91 are recorded onto the DVD 4 for recording loaded in the DVD player/recorder 1. Referring to FIG. 23, in step S111, the IEEE 1394 interface 61 of the DVD player/recorder 1 receives the recording disk ID transmitted through the IEEE 1394 serial bus 81 and sends the received recording disk ID to the CPU 11. In step S112, the CPU 11 stores the recording disk ID into the EEPROM 18. In step S113, the CPU 11 controls the recording and reproduction section 14 to operate to record the recording disk ID into a predetermined region of the DVD 4 loaded in the recording and reproduction section 14. In step S114, the recording and reproduction section 14 records the data recorded on the DVD 4 loaded in the DVD player 91 and received by the IEEE 1394 interface 61 over the IEEE 1394 serial bus 81 onto the DVD 4 loaded in the DVD player/recorder 1.

Reproduction of the DVD 4 onto which the data have been recorded by the processing of FIG. 23 is performed by executing the reproduction processing of FIG. 8 by the DVD player/recorder 1 by which the data have been recorded. However, such reproduction is not performed by any DVD player/recorder other than the DVD player/recorder 1 by which the data have been recorded onto the DVD 4.

As described above, information of the DVD 4 can be reproduced only by the predetermined DVD player/recorder 1 which corresponds to the DVD 4.

It is to be noted that the DVD player/recorder 1 or DVD player 91 described above may be constructed otherwise such that it can write an ID unique to the user such that the ID may operate similarly to the apparatus ID described in the present specification. If the same unique ID is written by all of apparatus owned by the user, then the DVD 4 can be played back by any of the apparatus.

Meanwhile, the recording track 21 of the DVD 4 shown in FIG. 3 may be constructed alternatively such that predetermined data representing that a disk ID has not been read as yet is recorded in advance therein and the DVD player/recorder 1 erases the predetermined data recorded on the recording track 21 of the DVD 4 in step S34 of FIG. 7.

Further, the EEPROM 18 shown in FIGS. 6, 9 and 21 may be replaced by a RAM card which can be removably loaded into the DVD player/recorder 1.

Furthermore, while it is described hereinabove that the seal 41 of FIG. 10 has an annular shape, it may be replaced by a rectangular seal on which a bar code is printed and which is applied to a predetermined position of a DVD 4. Otherwise, the bar code may be printed directly on the DVD 4.

It is to be noted that the received data recording processing of the DVD player/recorder 1 illustrated in FIG. 19 may be modified such that the DVD player 91 transmits the apparatus ID stored in the ROM 112 to the DVD player/recorder 1 and, the DVD player/recorder 1 performs, in step S82, processing of recording the received apparatus ID of the DVD player 91 into a predetermined region of the DVD 4 for recording loaded in the DVD player/recorder 1.

Further, while it is described that, in step S102 of FIG. 22, the CPU 11 calculates a recording disk ID based on the disk ID received from the reproduction section 162, the recording disk ID may be calculated alternatively based on a predetermined calculation expression independently of the disk ID received from the reproduction section 162.

Furthermore, while it is described that, in FIGS. 16 to 23, data are supplied from the DVD player 91, only if predetermined data can be supplied, they may be received from any recording medium such as a magnetic disk, a CD-ROM or a solid state memory or any communication medium such as satellite communication, ground wave communication or a telephone network.

While it is described in the present specification that the medium onto which data is recorded is a DVD (DVD 4), it may alternatively be an optical disk, a magnetic tape, a magnetic disk or a solid state memory such as a semiconductor memory.

Further, a providing medium with which a computer program for performing such processing as described above is provided to a user may be a storage medium such as magnetic disk, a CD-ROM or a solid state memory or a communication medium such as a network or a communications satellite.

Furthermore, while it is described that the present invention is applied so that reproduction of information is restricted, naturally the present invention can be applied so that processing of copying or dubbing information may be restricted.

While preferred embodiments of the present invention have been described using specific terms, such description is for illustrative purposes only, and it is to be understood that changes and variations may be made without departing from the spirit or scope of the following claims.

What is claimed is:

1. An information reproduction apparatus for reproducing data directly from a disk medium; comprising:

reproducing means for reading read data and a disk identifier from the disk medium; said read data indicating whether the disk medium has been previously read; said disk identifier identifying said disk medium;

a memory for storing said disk identifier, if said disk medium has not been previously read;

recording means for recording read data onto said disk medium to indicate the disk medium has now been read, if said disk medium had not been previously read; and control means for determining whether said disk identifier read from said disk medium is stored in said memory; said control means allowing said reproducing means to reproduce said data from said disk medium if said disk identifier is stored in said memory, and preventing said reproducing means from reproducing said data from the disk medium if the disk identifier is not stored in said memory.

2. The information reproduction apparatus according to claim 1, wherein said memory is an electrically erasable programmable read only memory (EEPROM).

3. The information reproduction apparatus according to claim 1, wherein said data is audio or video data.

4. A method of reproducing data directly from a disk medium; comprising the steps of:

reading read data and a disk identifier from the disk medium; said read data indicating whether the disk medium has been previously read; said disk identifier identifying said disk medium;

storing said disk identifier in a memory, if said disk medium has not been previously read;

recording read data onto said disk medium to indicate the disk medium has now been read, if said disk medium had not been previously read;

determining whether said disk identifier read from said disk medium is stored in said memory; and reproducing said data from said disk medium if said disk identifier is stored in said memory.

5. The method according to claim 4, wherein said memory is an electrically erasable programmable read only memory (EEPROM).

6. The method according to claim 4, wherein said data is audio or video data.

* * * * *

UNITED STATES PATENT AND TRADEMARK OFFICE
CERTIFICATE OF CORRECTION

PATENT NO.   : 6,947,362 B2
DATED        : September 20, 2005
INVENTOR(S)  : Yoichiro Sako et al.

It is certified that error appears in the above-identified patent and that said Letters Patent is hereby corrected as shown below:

Column 1,
Line 52, change "corded are" to -- recorded and --.

Signed and Sealed this

Twenty-eighth Day of February, 2006

JON W. DUDAS
*Director of the United States Patent and Trademark Office*